(12) United States Patent
Park et al.

(10) Patent No.: US 11,640,538 B2
(45) Date of Patent: May 2, 2023

(54) NEURAL PROCESSING APPARATUS AND METHOD WITH NEURAL NETWORK POOL PROCESSING

(71) Applicants: Samsung Electronics Co., Ltd., Suwon-si (KR); Seoul National University R&DB Foundation, Seoul (KR)

(72) Inventors: Hyunsun Park, Suwon-si (KR); Soonhoi Ha, Seoul (KR); Donghyun Kang, Seoul (KR); Jintaek Kang, Seoul (KR)

(73) Assignees: Samsung Electronics Co., Ltd., Suwon-si (KR); Seoul National University R&DB Foundation, Seoul (KR)

( * ) Notice: Subject to any disclaimer, the term of this patent is extended or adjusted under 35 U.S.C. 154(b) by 492 days.

(21) Appl. No.: 16/826,373

(22) Filed: Mar. 23, 2020

(65) Prior Publication Data
US 2021/0097403 A1     Apr. 1, 2021

(30) Foreign Application Priority Data

Sep. 26, 2019   (KR) ................. 10-2019-0119090

(51) Int. Cl.
  *G06N 3/10*  (2006.01)
  *G06N 3/063* (2006.01)
  *G06N 3/04*  (2023.01)
(52) U.S. Cl.
  CPC ............. *G06N 3/10* (2013.01); *G06N 3/04* (2013.01); *G06N 3/063* (2013.01)

(58) Field of Classification Search
  CPC . G06N 3/10; G06N 3/063; G05B 2219/33024
  See application file for complete search history.

(56) References Cited

U.S. PATENT DOCUMENTS

2017/0124409 A1   5/2017  Choi et al.
2018/0232629 A1*  8/2018  Du ........................... G06N 3/04
(Continued)

FOREIGN PATENT DOCUMENTS

| KR | 10-2016-0034814 A | 3/2016 |
| KR | 10-2018-0107869 A | 10/2018 |
| KR | 10-2019-0030034 A | 3/2019 |

OTHER PUBLICATIONS

Chen YH, Krishna T, Emer JS, Sze V. Eyeriss: An energy-efficient reconfigurable accelerator for deep convolutional neural networks. IEEE journal of solid-state circuits. Nov. 8, 2016;52(1):127-38. (Year: 2016).*

(Continued)

*Primary Examiner* — Chuen-Meei Gan
(74) *Attorney, Agent, or Firm* — NSIP Law

(57) ABSTRACT

A processor-implemented method of a neural network includes obtaining intermediate pooling results, respectively corresponding to sub-pooling kernels obtained by decomposing an original pooling kernel, by performing a pooling operation on input pixels included in a current window in an input feature map with the sub-pooling kernels, obtaining a final pooling result corresponding to the current window by post-processing the intermediate pooling results, and determining an output pixel value of an output feature map, based on the final pooling result, wherein the current window is determined according to the original pooling kernel having been slid, according to a raster scan order, in the input feature map.

25 Claims, 13 Drawing Sheets

(56) References Cited

U.S. PATENT DOCUMENTS

| | | |
|---|---|---|
| 2018/0276532 A1 | 9/2018 | Kim et al. |
| 2019/0042923 A1* | 2/2019 | Janedula .............. G06N 3/0445 |
| 2019/0080239 A1 | 3/2019 | Yang |
| 2019/0102640 A1 | 4/2019 | Balasubramanian |
| 2019/0392253 A1 | 12/2019 | Ji et al. |

OTHER PUBLICATIONS

Kang J, Yi Y, Chung K, Ha S. NNsim: fast performance estimation based on sampled simulation of GPGPU kernels for neural networks. In2018 55th ACM/ESDA/IEEE Design Automation Conference (DAC) Jun. 24, 2018 (pp. 1-6). IEEE. (Year: 2018).*

Park H, Lee JH, Oh Y, Ha S, Lee S. Training deep neural network in limited precision. arXiv preprint arXiv:1810.05486. Oct. 12, 2018. (Year: 2018).*

Fan, Xiaochuan, et al., "Object Detection with Mask-based Feature Encoding," arXiv preprint arXiv:1802.03934, 2018 (pp. 1-10).

"Unit Description"—Figs. 66 and 67 Discussion http://nvdia.org/hw/v1/ias/unit_description.html (2 page in English). Corresponding to subject matter identified as "Wayback Machine" (pp. 1-2) in the Dec. 23, 2020 Extended European Search Report. This current submission also corresponds to citation 1 of the NPL documents submitted with the Dec. 28, 2020 IDS, where the 'Unit Description' document was submitted in full (including the presently submitted material with respect to Figs 66 and 67).

Extended European Search Report dated Dec. 23, 2020 in counterpart European Patent Application No. 20181380.5 (16 pages in English).

"Unit Description—NVDLA Documentation" nvdla.org/hw/v1/ias/unit_description.html Dec. 23, 2020 pp. 1-38.

Chen, Yu-Hsin, "Eyeriss: An energy-efficient reconfigurable accelerator for deep convolutional neural networks" *IEEE Journal of Solid-State Circuits* 2016 pp. 1-12.

* cited by examiner

NEURAL PROCESSING APPARATUS AND METHOD WITH NEURAL NETWORK POOL PROCESSING

CROSS-REFERENCE TO RELATED APPLICATIONS

This application claims the benefit under 35 USC 119(a) of Korean Patent Application No. 10-2019-0119090 filed on Sep. 26, 2019 in the Korean Intellectual Property Office, the disclosure of which is incorporated herein in its entirety by reference for all purposes.

BACKGROUND

1. Field

Provided are a neural processing apparatus and a method with neural network pool processing.

2. Description of Related Art

A neural network may be a computing system implemented by referring to a set machine learning that analyzes input data and extracts valid information, for example, as various types of electronic systems.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a processor-implemented method of a neural network includes obtaining intermediate pooling results, respectively corresponding to sub-pooling kernels obtained by decomposing an original pooling kernel, by performing a pooling operation on input pixels included in a current window in an input feature map using the sub-pooling kernels, obtaining a final pooling result corresponding to the current window by post-processing the intermediate pooling results, and determining an output pixel value of an output feature map, based on the final pooling result, wherein the current window is determined according to the original pooling kernel having been slid, according to a raster scan order, in the input feature map.

The sub-pooling kernels may be 1-dimensional (1 D) kernels, respectively comprising row elements of the original pooling kernel, and a total number of sub-pooling kernels obtained by decomposing from the original pooling kernel may correspond to a height of the original pooling kernel.

An intermediate pooling result obtained by a sub-pooling kernel from among the sub-pooling kernels with respect to the current window may be shared with at least one other window in the input feature map.

The final pooling result may be obtained in response to all of the intermediate pooling results being obtained for the current window.

Intermediate pooling results corresponding to a same window may be respectively stored in memory cells comprising memory addresses of a same column and different rows in a share line buffer.

The method may further include receiving a value of a current input pixel included in the current window according to the raster scan order for the input feature map, wherein the obtaining of the intermediate pooling results includes updating at least one partial pooling result stored in at least one memory cell affected by the received value of the current input pixel, based on the received value of the current input pixel.

The obtaining of the final pooling result corresponding to the current window may include reading the intermediate pooling results for the current window from the memory cells of the share line buffer, and obtaining the final pooling result corresponding to the output pixel value by performing, on the read intermediate pooling results, a post-processing operation according to a pre-set pooling type.

The share line buffer may store, in memory lines of a total number of rows corresponding to a height of the original pooling kernel, intermediate pooling results obtained for other windows in the input feature map, in a circular manner.

An intermediate pooling result stored in one memory cell of the share line buffer may be re-used for a subsequent intermediate pooling result obtained by another sub-pooling kernel to be stored, in response to the intermediate pooling result stored in the one memory cell no longer being shared, to obtain a final pooling result corresponding to another window.

The method of may further include obtaining a hyper-parameter, of the neural network, comprising information about any one or any combination of any two or more of a size of the original pooling kernel, a stride size, and a pooling type, wherein a share line buffer storing the obtained intermediate pooling results may be addressed based on the obtained hyper-parameter.

The pooling operation may be an operation based on a pooling type of max pooling, wherein each of the intermediate pooling results is a maximum value from among values of input pixels mapped to a corresponding sub-pooling kernel and the final pooling result is a maximum value among the intermediate pooling results, or the pooling operation may be an operation based on a pooling type of average pooling, wherein each of the intermediate pooling results is a sum of the values of input pixels mapped to the corresponding sub-pooling kernel and the final pooling result is a value obtained by dividing a sum of the intermediate pooling results by a size of the original pooling kernel.

In another general aspect, a non-transitory computer-readable storage medium stores instructions that, when executed by one or more processors, cause the one or more processors to perform the method described above.

In another general aspect, a neural processing apparatus includes one or more processors configured to obtain intermediate pooling results respectively corresponding to sub-pooling kernels obtained by decomposing an original pooling kernel, by performing a pooling operation on input pixels included in a current window in an input feature map with the sub-pooling kernels, obtain a final pooling result corresponding to the current window by post-processing the intermediate pooling results, and determine an output pixel value of an output feature map, based on the final pooling result, wherein the current window is determined according to the original pooling kernel having been slid, according to a raster scan order, in the input feature map.

The neural processing apparatus may further include a memory configured to store instructions, that when executed by the one or more processors configure the one or more processors to perform the obtaining of the intermediate pooling results, the obtaining of the a final pooling result, and the determining of the output pixel value.

The sub-pooling kernels may be 1-dimensional (1D) kernels respectively comprising row elements of the original pooling kernel, and a total number of sub-pooling kernels obtained by decomposing from the original pooling kernel may correspond to a height of the original pooling kernel.

An intermediate pooling result obtained by a sub-pooling kernel from among the sub-pooling kernels with respect to the current window is shared with at least one other window in the input feature map.

The final pooling result may be obtained in response to all of the intermediate pooling results being obtained for the current window.

Intermediate pooling results corresponding to a same window may be respectively stored in memory cells comprising memory addresses of a same column and different rows in a share line buffer included in the memory.

The one or more processors may be further configured to receive a value of a current input pixel included in the current window according to the raster scan order for the input feature map, and update at least one partial pooling result stored in at least one memory cell affected by the received value of the current input pixel, based on the received value of the current input pixel.

The one or more processors may be further configured to read the intermediate pooling results for the current window from the memory cells of the share line buffer to obtain the final pooling result corresponding to the current window and obtain the final pooling result corresponding to the output pixel value by performing, on the read intermediate pooling results, a post-processing operation according to a pre-set pooling type.

The share line buffer may store, in memory lines of a total number of rows corresponding to a height of the original pooling kernel, intermediate pooling results obtained for other windows in the input feature map, in a circular manner.

An intermediate pooling result stored in one memory cell of the share line buffer is re-used for a subsequent intermediate pooling result obtained by another sub-pooling kernel to be stored, in response to the intermediate pooling result stored in the one memory cell no longer being shared, to obtain a final pooling result corresponding to another window.

The one or more processors may be further configured to obtain a hyper-parameter of the neural network, comprising information about any one or any combination of any two or more of a size of the original pooling kernel, a stride size, and a pooling type, wherein a share line buffer included in the memory to store the obtained intermediate pooling results may be addressed based on the hyper-parameter.

The pooling operation may be an operation based on a pooling type of max pooling, wherein each of the intermediate pooling results is a maximum value from among values of input pixels mapped to a corresponding sub-pooling kernel and the final pooling result is a maximum value among the intermediate pooling results, or the pooling operation may be an operation based on a pooling type of average pooling, wherein each of the intermediate pooling results is a sum of the values of input pixels mapped to the corresponding sub-pooling kernel and the final pooling result is a value obtained by dividing a sum of the intermediate pooling results by a size of the original pooling kernel.

In another general aspect, a processor-implemented method of a neural network includes obtaining intermediate pooling results, respectively corresponding to sub-pooling kernels obtained by decomposing an original pooling kernel, from input pixels included in a current window to be pooled in an input feature map with sub-pooling kernels, obtaining a final pooling result corresponding to the current window from the intermediate pooling results, in response to the intermediate pooling being complete for the current window, the current window being determined as the original pooling kernel is slid in the input feature map, and determining an output pixel value of an output feature map, based on the final pooling result.

The original pooling kernel may be slid according to a raster scan order.

The sub-pooling kernels may be 1-dimensional (1D) kernels, respectively comprising row elements of the original pooling kernel, and a total number of sub-pooling kernels obtained by decomposing from the original pooling kernel may correspond to a height of the original pooling kernel.

At least one of the sub-pooling kernels with respect to the current window may be shared as a sub-pooling kernel with respect to at least one other window in the input feature map.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1:
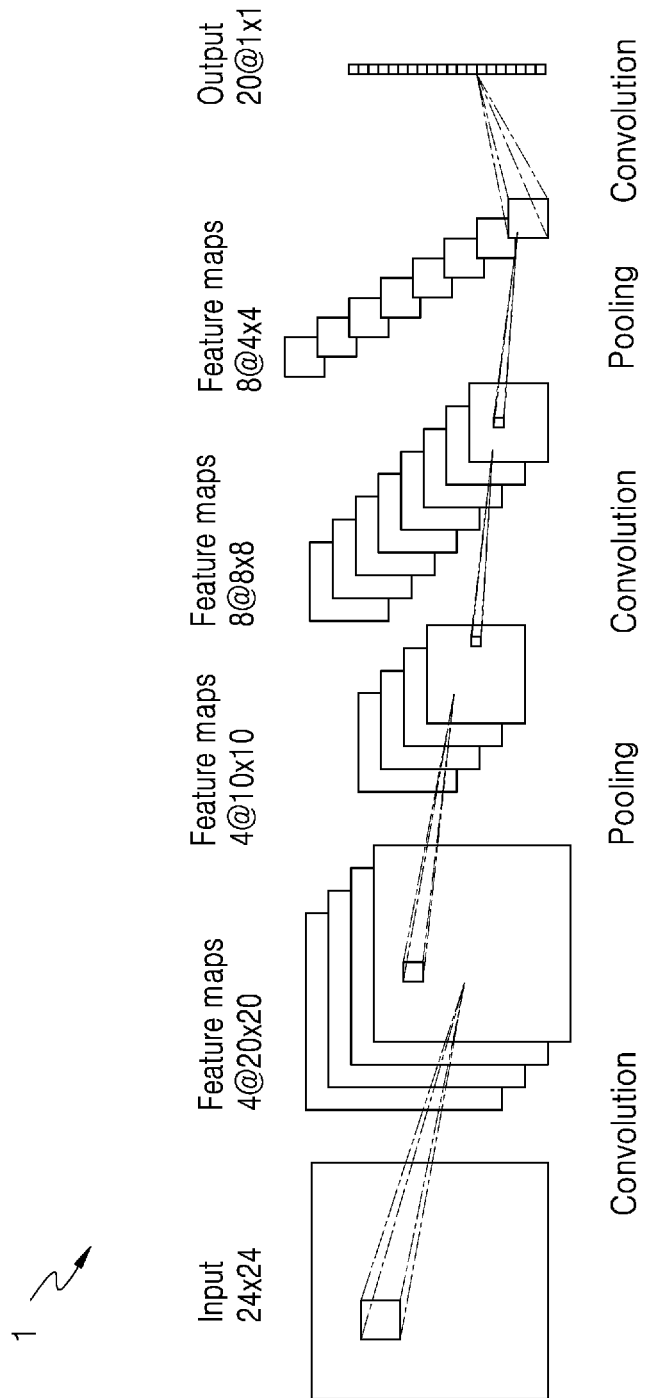
FIG. 1 is a diagram for describing an architecture of a neural network, according to an example.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

The features of the examples described herein may be combined in various ways as will be apparent after an understanding of the disclosure of this application. Further, although the examples described herein have a variety of configurations, other configurations are possible as will be apparent after an understanding of the disclosure of this application.

Terms used herein should be construed as having meanings that are obvious to one of ordinary skill in the art after an understanding of the present disclosure, but may have different meanings according to an intention of one of ordinary skill in the art, precedent cases, or the appearance of new technologies after an understanding of the present disclosure. Also, some terms may be arbitrarily selected by the applicant, and in this case, the meaning of the selected terms will be described in detail in the detailed description. Thus, the terms used herein have to be defined based on the meaning of the terms together with the description throughout the specification.

Herein, it is noted that use of the term "may" with respect to an example or embodiment, e.g., as to what an example or embodiment may include or implement, means that at least one example or embodiment exists where such a feature is included or implemented while all examples and embodiments are not limited thereto.

Hereinafter, embodiments will be described in detail with reference to accompanying drawings. However, the embodiments may be implemented in many different forms and are not limited to those described herein.

An apparatus implementing the neural network may use a large quantity of calculations with respect to complex input data to the neural network. As data of the neural network increases and connectivity of an architecture constituting the neural network becomes complex, excessive increases in the quantity of calculations of the apparatus and in memory access frequency may occur, resulting in inefficient performance with respect to miniaturization and commercialization issues.

FIG. 1 is a diagram for describing an architecture of a neural network, according to an example.

Referring to the example of FIG. 1, the neural network 1 may be an architecture of a deep neural network (DNN) or an n-layers neural network, as non-limiting examples. The DNN or n-layers neural network may correspond to a convolution neural network (CNN), a recurrent neural network (RNN), a deep belief network, or a restricted Boltzmann machine, and any combinations thereof, as non-limiting examples. For example, the neural network 1 may be implemented as a CNN, but a type of the neural network 1 is not limited to a CNN, but may instead further include be another type of neural network.

The neural network 1 may be implemented as a computing architecture having a plurality of layers including an input image provided to an input layer, feature maps generated by hidden or intervening layers, and an output layer. The input image in the neural network 1 may be subjected to a convolution operation with a filter referred to as a weight kernel. As a result of the convolution operation, output feature maps may be output. The output feature maps generated at this time may be used as input feature maps of a next layer where they may be subjected to another convolution operation with another kernel again, and thus further output feature maps are output. As a result of iteratively performing such a convolution operation, where the input of a subsequent convolution operation is dependent on an output of a previous convolution operation, a recognition result regarding features of the input image may be finally output through the neural network 1.

For example, when an image of a 24×24 pixel size is input to the neural network 1 of the example of FIG. 1, the input image may be output as feature maps of four channels, each having a 20×20 pixel size, via the convolution operation with the first kernel by a first hidden layer. Subsequently, the respective sizes of the generated feature maps may be progressively reduced by the iterative convolution operations with each subsequent convolution operating hidden layer and the corresponding kernels, and with features of a 1×1 pixel size being output by a last convolution operating hidden layer. In such an example, the neural network 1 may filter and output robust features that may represent the entire image from the input image by iteratively performing the convolution operation along with a pooling operation or a sub-sampling operation in several layers, and may derive the recognition result of the input image by finally outputting features, as illustrated in FIG. 1.

In addition, a pooling layer performing the pooling operation may be arranged to occur subsequent to a convolution layer. The pooling operation of the pooling layer may be a process for reducing a computational overhead for a next convolution layer by reducing a size, for example, rows by columns, of an output feature map of a previous convolution layer that is input to the next convolution layer.

In subsequent examples, a method of effectively performing a pooling operation on an input feature map in a pooling layer will be described in further detail.

Figure 2:
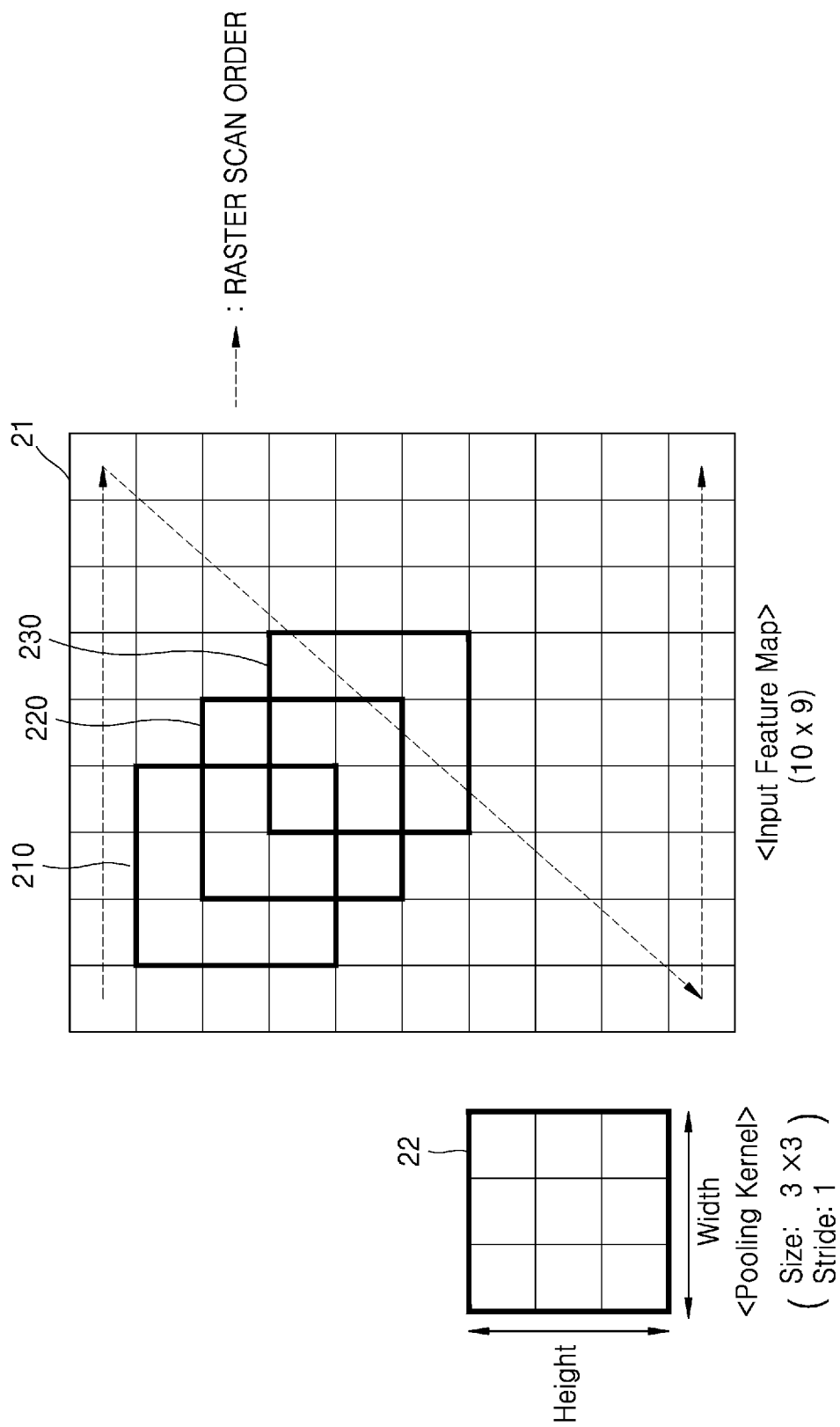
FIG. 2 is a diagram for describing a concept of a pooling operation performed in a pooling layer of a neural network.

FIG. 2 is a diagram for describing a concept of a pooling operation performed in a pooling layer of a neural network.

Referring to the example of FIG. 2, an input feature map 21 may have a 10×9 size, where sizes are provided as rows by columns and a pooling kernel 22, also referred to as a pooling window. The pooling kernel 22 performing a pooling operation on the input feature map 21 may have a 3×3 size. Also, a stride indicating a degree of the pooling kernel 22 sliding on the input feature map 21 may be 1. However, a hyper-parameter, such as the size of the pooling kernel 22, the stride, or a pooling type, of the pooling operation is not limited to those described with reference to FIG. 2 and may vary in other examples.

The pooling kernel 22 may perform the pooling operation while being slid in units of windows, also referred to as a pixel group, block, or scan window, of a 3×3 size, with respect to the 10×9 pixels of the input feature map 21. For example, a sliding order may depend on a raster scan order for the input feature map 21. The raster scan order for the input feature map 21 may denote an order in which pixels of a first row are sequentially processed from a pixel of the first row and a first column of the input feature map 21, pixels from a second row to the tenth row are processed subsequently, and lastly, a pixel of the tenth row and a ninth column is processed.

When pixels corresponding to the pooling kernel 22 mapped to a window of a current order in the input feature map 21 are all scanned according to the raster scan order, the pooling kernel 22 may perform the pooling operation on the pixels. For example, the pooling operation by the pooling kernel 22 mapped to a window 210 in the input feature map 21 may be performed by using values of pixels included in the window 210 when the pixels are all scanned according to the raster scan order. Also, the pooling operation regarding each of a window 220 and a window 230 may be performed when all of the pixels included in each of the window 220 and the window 230 are all scanned according to the raster scan order.

In the example of FIG. 2, only some windows 210, 220, and 230 are illustrated for convenience of description. The sliding of the pooling kernel 22 regarding the example windows 210 to 230 and the remaining windows may be performed based on the size of the pooling kernel 22 and the stride.

In addition, pooling results may be obtained when the pooling operation is performed on the input feature map 21 by the pooling kernel 22 in such a manner, wherein the pooling results may respectively correspond to output pixels of an output feature map.

Figure 3:
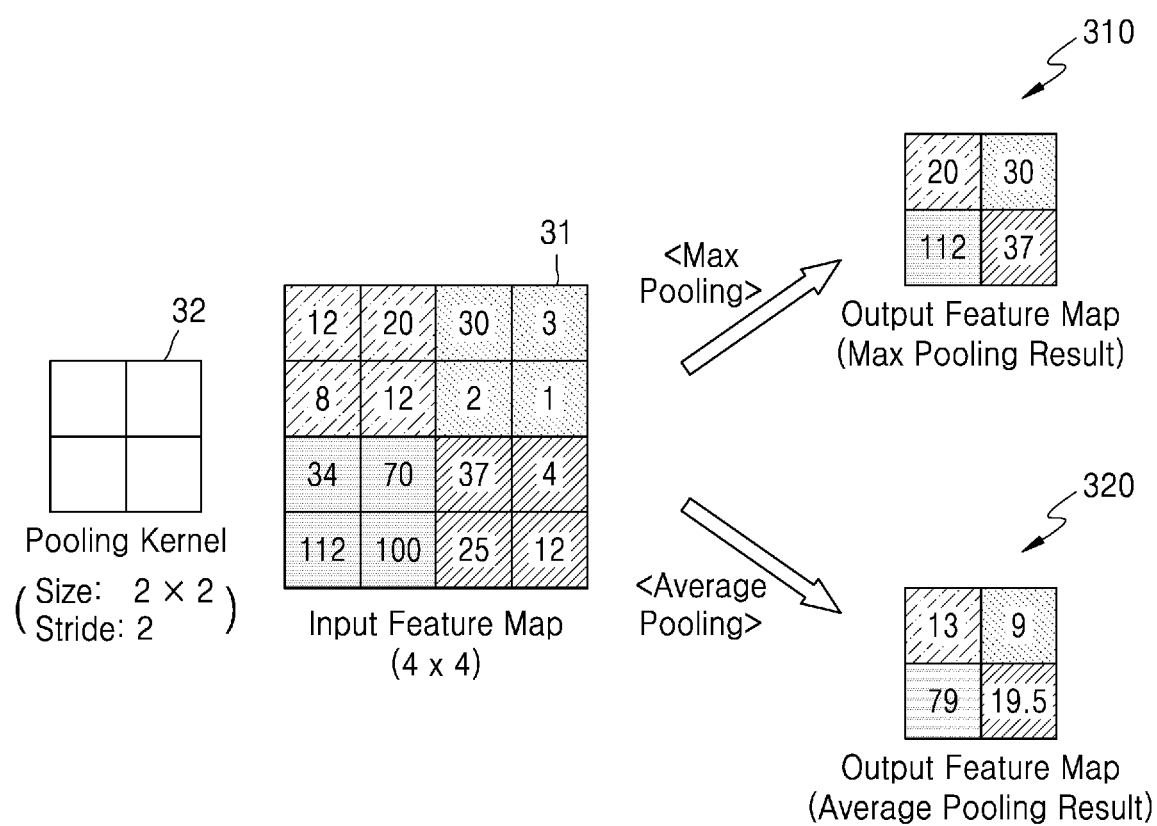
FIG. 3 is a diagram for describing different pooling types for performing a pooling operation.

FIG. 3 is a diagram for describing some example different pooling types for performing a pooling operation.

Referring to the example of FIG. 3, an input feature map 31 may have a 4×4 size, a pooling kernel 32 may have a 2×2 size. In such an example, a stride may be 2 for convenience of description about a pooling type. However, these values are only non-limiting examples.

A pooling operation for pixels of a window mapped to the pooling kernel 32 may be an operation based on a pooling type of max pooling or a pooling type of average pooling. However, the pooling operation is not limited to these types of pooling, and the pooling operation may be performed according to a pooling type other than those described with reference to the example of FIG. 3, in other examples.

First, the max pooling will be described in further detail. The max pooling indicates that the pooling operation may be performed by using maximum values of pixels of the input feature map 31 mapped to the pooling kernel 32 as a result of the respective pooling operations.

As a particular example, when the pooling kernel 32 is mapped to four pixels included in a 2×2 upper left window of the input feature map 31, the pooling kernel 32 may obtain, as a pooling result corresponding to the upper left window, a value of "20" that is a maximum value from among pixel values "12," "20," "8," and "12" included in the upper left window. Max pooling is also performed on a 2×2 upper right window, a 2×2 lower left window, and a 2×2 lower right window in the input feature map 31, using the pooling kernel 32, as shown in the first example of FIG. 3, respective pooling results of which would be "30," "112," and "37" as the maximum values in the respective windows. The pooling results "20," "30," "112," and "37" of the max pooling for the input feature map 31 may correspond to pixel values of output pixels of an output feature map 310 that may then be input to a next convolutional layer, for example.

Next, the average pooling will be described in further detail. The average pooling indicates that the pooling operation may be performed by using the respective averages of pixels of the input feature map 31 mapped to the pooling kernel 32.

As a particular example, when the pooling kernel 32 is mapped to the four pixels included in the 2×2 upper left window of the input feature map 31, the pooling kernel 32 obtains, as the pooling result corresponding to the upper left window, "13" that is an average value of the pixel values "12," "20," "8," and "12" included in the upper left window. Here, the average value used is a mean value. Average pooling is also performed on the 2×2 upper right window, the 2×2 lower left window, and the 2×2 lower right window in the input feature map 31, as shown in the second example of FIG. 3, respective pooling results of which would be "9," "79," and "19.5" as the averages using the pooling kernel 32 of the respective windows. The pooling results "13," "9," "79," and "19.5" of the average pooling for the input feature map 31 may correspond to pixel values of output pixels of an output feature map 320, that may then be input to a next convolutional layer, for example.

In other words, even when the pooling operation is performed by the same pooling kernel 32, generated output feature maps may be different based on a pooling type used in the pooling operation. Non-limiting examples of pooling types of max pooling type and average pooling type are discussed in greater detail above, but other pooling types are available in other examples. The pooling type may be a hyper-parameter as described above and may be predefined with respect to a neural network.

Figure 4:
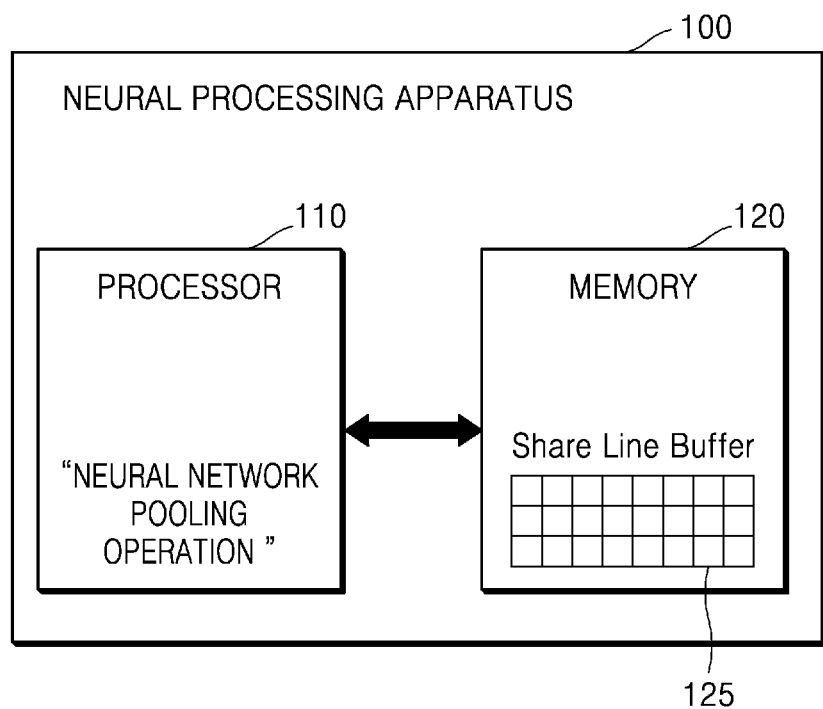
FIG. 4 is a block diagram of a hardware configuration of a neural processing apparatus for processing pooling of a neural network, according to an example.

FIG. 4 is a block diagram of a hardware configuration of a neural processing apparatus 100 processing pooling of a neural network, according to an example.

Referring to the example of FIG. 4, the neural processing apparatus 100 may include a processor 110 and a memory 120. Components of the neural processing apparatus 100 related to the current example are shown in the example of FIG. 4, noting that the illustrated neural processing apparatus 100 is representative of alternate and/or including additions in various examples of FIG. 4. Thus, the neural processing apparatus 100 may further include components other than those shown in the example of FIG. 4.

The neural processing apparatus 100 may correspond to a computing device. For example, as non-limiting examples, the neural processing apparatus 100 may correspond to a personal computer (PC), a server, or a mobile device, or may correspond to an accelerator for performing a neural network operation in such a device. In addition, the neural processing apparatus 100 may be representative of, or an apparatus included in, an autonomous vehicle, robotics, a smart phone, a tablet device, an augmented reality (AR) device, or an Internet of Things (IoT) device, e.g., which may perform voice recognition, image recognition, and similar tasks using the neural networks, as non-limiting examples. However, the neural processing apparatus 100 is not limited to these non-limiting examples, and may correspond to various types of devices or a processing apparatus that perform a neural network operation in such devices.

The processor 110 may be a hardware component that performs overall control functions for controlling operations of the neural processing apparatus 100. For example, the processor 110 may control the neural processing apparatus 100 in general by processing or executing instructions and/or data stored in the memory 120 in the neural processing apparatus 100. In examples, the processor 110 may be implemented as a central processing unit (CPU), a graphics processing unit (GPU), an application processor (AP), a neural processing unit (NPU), or a tensor processing unit (TPU) included in the neural processing apparatus 100, but is not limited to these enumerated non-limiting examples, and the processor 110 may be implemented as other types of processor or as multiple processors or combinations of processors.

The memory 120 may be hardware storing hyper-parameters, e.g., including trained parameters, of various received network examples herein and various types of neural network data processed or to be processed by the processor 110. For example, the memory 120 may store input/output feature map data, convolution data, and pooling data processed in the neural network, as discussed in further detail, above. Also, the memory 120 may store various applications to be driven by the processor 110, for example, a convolution process application, pooling process application, and other similar applications.

The memory 120 may correspond to a memory device, such as random access memory (RAM), read-only memory (ROM), a hard disk drive (HDD), a solid state drive (SSD), a compact flash (CF) card, a secure digital (SD) card, a micro-SD card, a mini-SD card, an extreme digital (xD) card, or a memory stick, but a type of the memory 120 is not limited to these non-limiting examples and may include other types of memory devices in other examples.

As shown in the example of FIG. 4, the memory 120 may include a share line buffer 125 as an on-chip memory for a neural network process by the processor 110. The share line buffer 125 may be implemented as dynamic RAM (DRAM) or static RAM (SRAM) for a high speed access with the processor 110, but the share line buffer 125 is not limited to these non-limiting examples and may include other types of memory technologies in other examples. In this example, the term "share line buffer" may be variously modified and referred by another term that also refers to a similar portion of the memory 120 used for buffering. In addition, the memory 120 may additionally include other buffers for buffering for other purposes, in addition to the share line buffer 125.

The processor 110 may be implemented to have at least one processor core for processing various operations for performing convolution and pooling of the neural network.

In particular, the processor 110 may generate an output feature map by performing respective convolution operations between input feature maps and corresponding kernel weights in layers of the neural network, each of which may generate a feature map for a next convolution layer by performing a pooling operation on the generated output feature map, as described in further detail throughout this disclosure. In addition, the processor 110 may perform various operations for implementing or executing the neural network.

When performing the pooling operation, the processor 110 may read, from the share line buffer 125 of the memory 120, pooling data such as input pixel values of the input feature map or a processed pooling result, may update the pooling data already stored in the share line buffer 125, or may write the pooling data to the share line buffer 125. In other words, the share line buffer 125 may operate as a memory for temporarily storing the pooling data of the processor 110.

Figure 5:
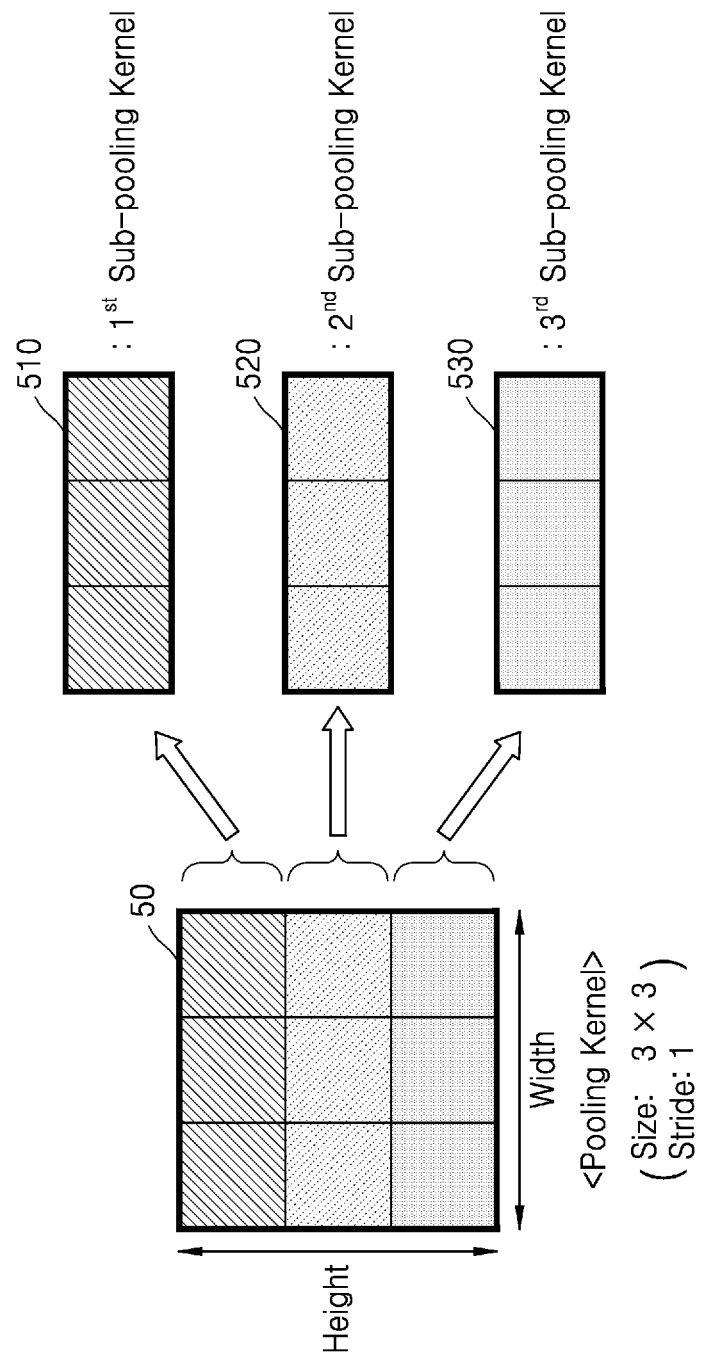
FIG. 5 is a diagram for describing sub-pooling kernels decomposed from a pooling kernel to perform a pooling operation, according to an example.

FIG. 5 is a diagram for describing a pooling operation performed using sub-pooling kernels decomposed from a pooling kernel, according to an example.

Referring to the example of FIG. 5, an original pooling kernel 50 may have a 3×3 size, noting that a size of the original pooling kernel 50 is not limited to a 3×3 size and may vary from such a size. Even when an original pooling kernel of a different size than 3×3 is used, a decomposing method as described below may be similarly applied.

Herein, prior to the kernel being decomposed, the kernel will be referred to by the term "original," e.g. the "original" pooling kernel 50.

The processor 110 may decompose the original pooling kernel 50 into a plurality of sub-pooling kernels 510 to 530, in order to perform a pooling operation. The sub-pooling kernels 510 to 530 may be one dimensional (1D) kernels, respectively including row elements of the original pooling kernel 50. In the examples, the sub-pooling kernels 510 to 530 may be obtained by decomposing the row elements of the original pooling kernel 50 according to the raster scan order described above, but when pixels in an input feature map are scanned in a raster scan order different from that described above, sub-pooling kernels may be obtained by decomposing elements of the original pooling kernel 50 in another direction. For example, sub-pooling kernels may be obtained by decomposing elements of the original pooling kernel 50 in a column direction. In other words, a decomposing direction may vary based on a raster scan order, in different examples.

The number of sub-pooling kernels 510 to 530 obtained by decomposing the original pooling kernel 50 may correspond to a height of the original pooling kernel 50. For example, because the height of the original pooling kernel 50 of FIG. 5 is 3, the number of sub-pooling kernels 510 to 530 is also 3.

Elements of the sub-pooling kernel 510 may correspond to elements of a first row of the original pooling kernel 50, elements of the sub-pooling kernel 520 may correspond to elements of a second row of the original pooling kernel 50, and elements of the sub-pooling kernel 530 may correspond to elements of a third row of the original pooling kernel 50.

The processor 110 may individually obtain intermediate pooling results by individually performing pooling operations on the sub-pooling kernels 510 to 530. Then, the processor 110 may merge the intermediate pooling results in order to output a final pooling result. In other words, according to the examples, the pooling operation may be performed in units of sub-pooling kernels instead of units of original pooling kernels. In the examples, the term "intermediate pooling result" refers to partial pooling data obtained by a sub-pooling kernel, and the term "final pooling result" refers to final pooling data corresponding to a window obtained from a plurality of intermediate pooling results.

Figure 6:
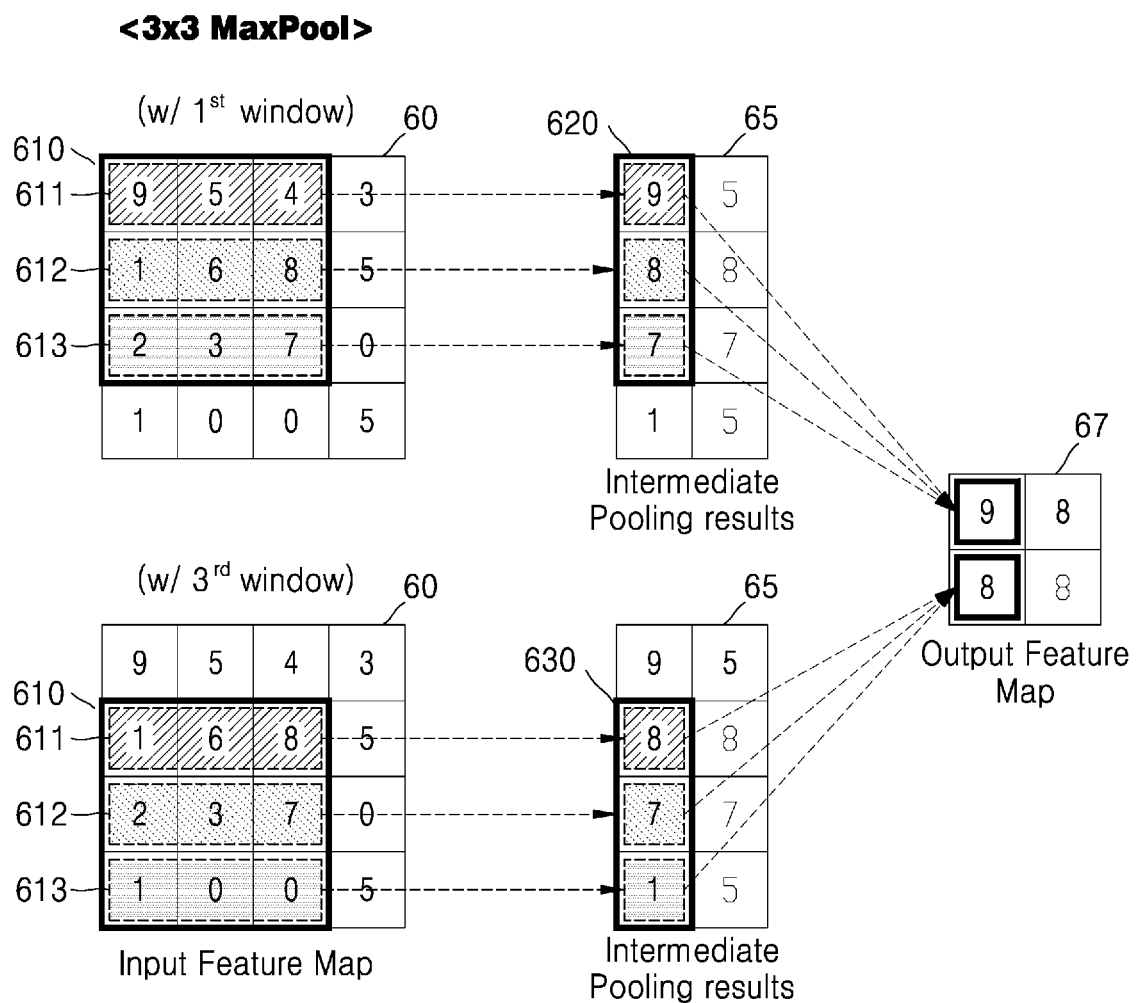
FIG. 6 is a diagram for describing a method of performing max pooling by using sub-pooling kernels decomposed from an original pooling kernel, according to an example.

FIG. 6 is a diagram for describing a method of performing max pooling (MaxPool) by using sub-pooling kernels 611 to 613 decomposed from an original pooling kernel 610, according to an example.

Referring to the example of FIG. 6, a MaxPool operation may be performed on an input feature map 60 of a 4×4 size by using the three 1×3 sub-pooling kernels 611 to 613 decomposed from the 3×3 original pooling kernel 610. In a pooling operation of the example of FIG. 6, a stride may be 1.

The processor 110 may obtain intermediate pooling results 65 respectively corresponding to the sub-pooling kernels 611 to 613 by performing a pooling operation on input pixels included in a current window to be pooled in the input feature map 60 by using the sub-pooling kernels 611 to 613 decomposed from the original pooling kernel 610.

When all of the intermediate pooling results 65 are obtained for the current window, the processor 110 may obtain a final pooling result corresponding to the current window by post-processing the intermediate pooling results 65. The processor 110 may then determine an output pixel value of an output feature map 67, based on the final pooling result.

In a particular example as shown in the example of FIG. 6, when the current window is a first window of the input feature map 60, the sub-pooling kernel 611 may be mapped to input pixels of a first row included in the first window. The processor 110 may determine a maximum value "9" chosen from among values "9," "5," and "4" of the input pixels of the first row and may obtain the maximum value "9" as an intermediate pooling result corresponding to the sub-pooling kernel 611. Also, the processor 110 may determine a maximum value "8" from among values "1," "6," and "8" of input pixels of a second row and a maximum value "7" from among values "2," "3," and "7" of input pixels of a third row, and obtains the maximum values "8" and "7" as intermediate pooling results corresponding to the sub-pooling kernels 612 and 613. In other words, intermediate pooling results 620 obtained by the sub-pooling kernels 611 to 613 as mapped to the first window may be elements of ("9," "8," "7").

When all of the intermediate pooling results 620 for the current window that is the example first window are obtained, the processor 110 may obtain the final pooling result corresponding to the current window that is the first window by post-processing the intermediate pooling results 620. Because the pooling type described with reference to the example of FIG. 6 is MaxPool, the processor 110 may perform a post-processing by determining a maximum value "9," e.g., by implementing, "Max (9, 8, 7)," from the intermediate pooling results 620. There, the processor 110 may thus determine the output pixel value "9" of the output feature map 67 corresponding to the current window or first window, based on the final pooling result "9."

Then, when the current window corresponds to a third window of the input feature map 60 according to a raster scan order, the sub-pooling kernels 611 to 613 may be respectively mapped to input pixels of first through third rows included in the third window. The processor 110 may determine maximum values ("8," "7," and "1") regarding the rows and may obtain elements ("8," "7," and "1") of intermediate pooling results 630 that correspond to the sub-pooling kernels 611 to 613.

When all of the intermediate pooling results 630 for the current window that is the third window are obtained, the processor 110 may perform a post-processing of determining a maximum value "8" which is chosen as the "Max(8, 7, 1)" from the intermediate pooling results 630 as a final pooling result, and may determine an output pixel value "8" of the output feature map 67 corresponding to the current window that is the third window, based on the final pooling result "8."

In the example of FIG. 6, the pooling operation may be performed on some windows, such as the first and third windows, of the input feature map 60, but the processor 110 may perform the pooling operation on the remaining windows in a similar manner and may finally obtain values of output pixels of the output feature map 67.

In other words, according to the pooling operation of the examples, the processor 110 may perform the pooling operation by using Equation 1 below when a 3×3 original pooling kernel includes, for example, nine elements designated as (a, b, c, d, e, f, g, h, i).

$$\text{Pool}(a,b,c,d,e,f,g,h,i)=\text{Pool}(\text{Pool}(a,b,c),\text{Pool}(d,e,f),\text{Pool}(g,h,i)) \quad \text{Equation 1:}$$

In other words, the processor 110 may perform intermediate pooling operations for each sub-pooling kernel, i.e., a sub-pooling kernel including elements of (a,b,c), a sub-pooling kernel including elements of (d,e,f), and a sub-pooling kernel including elements of (g,h,i) and may perform a post-processing pooling operation on intermediate pooling results, thereby obtaining a final pooling result. According to an example of MaxPool described with reference to the example of FIG. 6, a pooling operator may be a max operator.

Meanwhile, the sub-pooling kernels 612 and 613 when the current window is the first window of the input feature map 60 and the sub-pooling kernels 611 and 612 when the current window is the third window of the input feature map 60 may perform the pooling operation base on using the same input pixels of the input feature map 60. Accordingly, the intermediate pooling results obtained by the sub-pooling kernels 612 and 613 mapped to the first window may be reused as the intermediate pooling results of the sub-pooling kernels 611 and 612 mapped to the third window, in that they use some of the same information to perform their calculations in a similar manner. A pooling operation performed on input pixels that overlap in different windows of an input feature map are described in further detail in corresponding drawings below.

Even when a pooling type is not separately described in the description about the embodiments below, the examples below may be realized by being applied to a pooling type of MaxPool, a pooling type of average pooling (AvgPool), and other alternative pooling types available in other examples.

Figure 7:
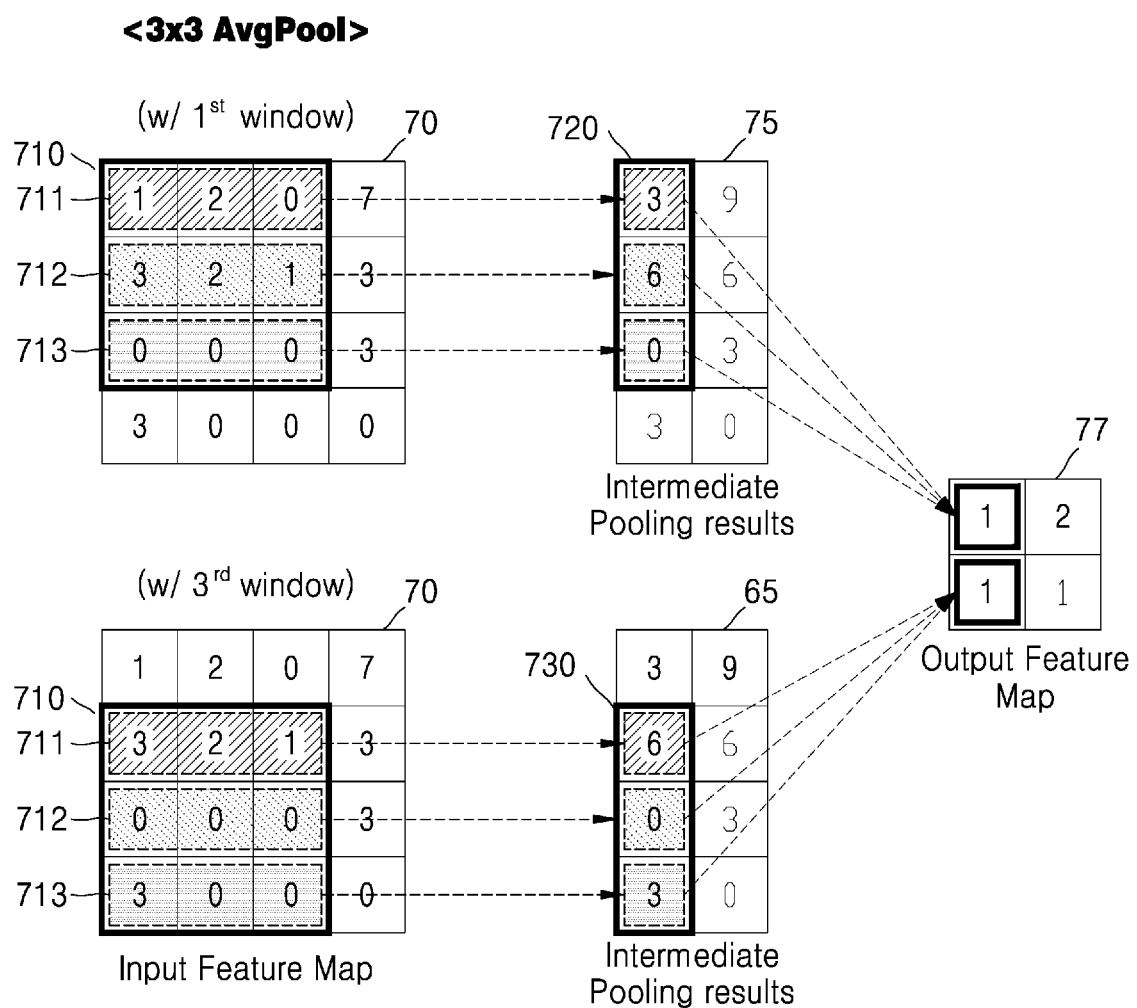
FIG. 7 is a diagram for describing a method of performing average pooling by using sub-pooling kernels decomposed from an original pooling kernel, according to an example.

FIG. 7 is a diagram for describing a method of performing AvgPool by using sub-pooling kernels 711 to 713 decomposed from an original pooling kernel 710, according to an example.

Referring to the example of FIG. 7, an AvgPool operation may be performed on an input feature map 70 of a 4×4 size by the three 1×3 sub-pooling kernels 711 to 713 decomposed from the 3×3 original pooling kernel 710. In a pooling operation of the example of FIG. 7, a stride may be 1.

The pooling operation performed by the sub-pooling kernels 711 to 713 decomposed from the original pooling kernel 710 with respect to the input feature map 70 as shown in the example of FIG. 7 may be similar to that described with reference to the example of FIG. 6. However, the AvgPool pooling operation of the example of FIG. 7 is different from the MaxPool pooling operation of the example of FIG. 6 in a method of obtaining an intermediate pooling result and a method of obtaining a final pooling result.

In particular, according to the example of FIG. 7, when a current window is a first window of the input feature map 70, the processor 110 may add values ("1," "2," and "0") of input pixel values of a first row included in the first window mapped to the sub-pooling kernel 711, and may obtains their sum "3," or (1+2+0) as an intermediate pooling result corresponding to the sub-pooling kernel 711. In other words, a method of calculating an intermediate pooling result according to the AvgPool approach is different from a method of calculating an intermediate pooling result according to the MaxPool approach.

Similarly, the processor 110 may obtains a sum "6," or (3+2+1) of values ("3", "2", and "1") of input pixels of a second row mapped to the sub-pooling kernel 712 and a sum "0," or (0+0+0) of values ("0," "0," and "0") of input pixels of a third row mapped to the sub-pooling kernel 713, respectively, as intermediate pooling values corresponding to the sub-pooling kernels 712 and 713. In other words, intermediate pooling results 720 obtained by the sub-pooling kernels 711 to 713, as mapped to the first window, are elements of the group ("3," "6," and "0").

When all of the intermediate pooling results 720 for the current window that is the first window are obtained, the processor 110 may obtain the final pooling result corresponding to the current window that is first window by post-processing the intermediate pooling results 720. Because the pooling type described with reference to the example of FIG. 7 is AvgPool, the processor 110 may add the intermediate pooling results 720 "3," "6," and "0," and may perform a post-processing of dividing the sum "9," or (3+6+0) by the size 3×3, or 9, of the original pooling kernel 710. Accordingly, the processor 110 may determine an output pixel value "1" of an output feature map 77 corresponding to the current window that is the first window, based on a final pooling result "1," or (9/9).

Similarly, when the current window is a third window of the input feature map 70, the processor 110 may perform an intermediate pooling operation on input pixels mapped to each of the sub-pooling kernels 711 to 713 to obtain elements of intermediate pooling results 730 ("6," "0," and "3").

When the intermediate pooling results 730 for the current window that is the third window are all obtained, the processor 110 may add the intermediate pooling results 730 "6," "0," and "3" and may perform a post-process of dividing the sum "9," or (6+0+3) by a size 3×3, or 9, of the original pooling kernel 710. Accordingly, the processor 110 may determine an output pixel value "1" of an output feature map 77 corresponding to the current window that is the third window, based on a final pooling result "1," or (9/9).

In the example of FIG. 7, the pooling operation may be performed on some windows, including the first and third windows, of the input feature map 70, but the processor 110 may perform the pooling operation on the remaining windows in a similar manner and may finally obtain values of output pixels of the output feature map 77.

In other words, according to the pooling operation of the examples, the processor 110 may perform the pooling operation by using Equation 1 above when a 3×3 original pooling kernel includes, for example, elements of (a, b, c, d, e, f, g, h, i). However, unlike the example of FIG. 6, a pool operator calculating an intermediate pooling result may be a sum/add operator, and a pool operator calculating a final pooling result may be an averaging operator.

As in the example of FIG. 6, the sub-pooling kernels 712 and 713 when the current window is the first window of the input feature map 70 and the sub-pooling kernels 711 and 712 when the current window is the third window of the input feature map 70 may perform the pooling operation on the same input pixels of the input feature map 70. Accordingly, the intermediate pooling results obtained by the sub-pooling kernels 712 and 713 mapped to the first window may be reused as the intermediate pooling results of the sub-pooling kernels 711 and 712 mapped to the third window. As discussed above, certain information may be reused in a similar manner, avoiding redundant calculation. A pooling operation performed on input pixels that overlap in different windows of an input feature map are described in further detail in the corresponding drawings, below.

In the examples of FIGS. 6 and 7, for convenience of description, a 4×4 input feature map, a 3×3 original pooling kernel, and a stride 1 have been described as a non-limiting example, but the pooling operations described with reference to the examples FIGS. 6 and 7 may be readily applied in the same manner to an input feature map of another size, an original pooling kernel of another size, and a stride of another value, in other examples.

Figure 8:
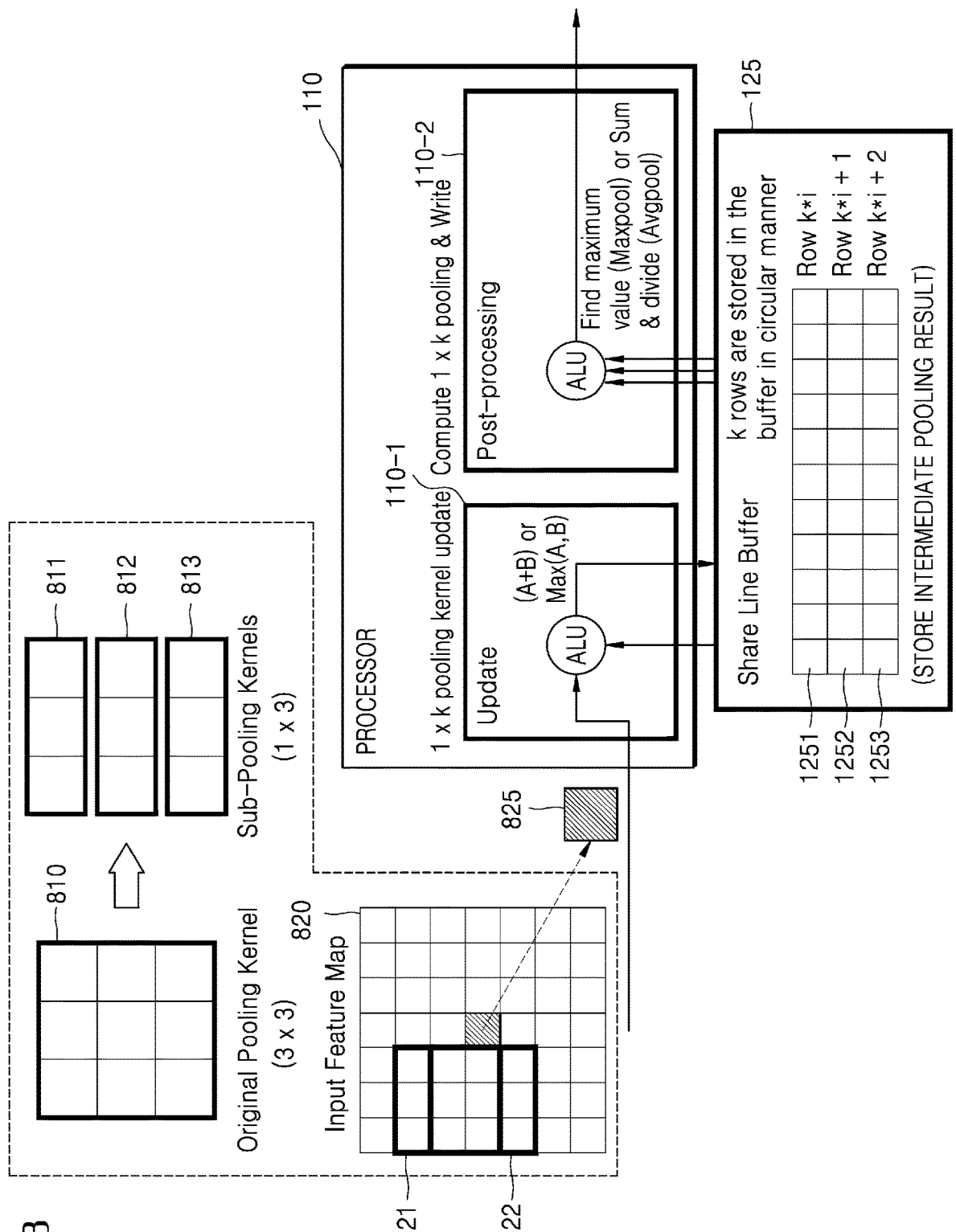
FIG. 8 is a diagram for describing a method, performed by a processor and a share line buffer of a memory, of processing a pooling operation using a sub-pooling kernel, according to an example.

FIG. 8 is a diagram for describing a method, performed by a processor and a share line buffer of a memory, of processing a pooling operation using sub-pooling kernels 811 to 813, according to an example. As a non-limiting example and for convenience of explanation, below, the processor, share line buffer, and memory may correspond to processor 110, share line buffer 125, and memory 120 of FIG. 4

Referring to the example of FIG. 8, a 3×3 original pooling kernel 810 may be decomposed into the 1×3 sub-pooling kernels 811 to 813, and a pooling operation may be performed on an input feature map 820 by using the sub-pooling kernels 811 to 813. However, in the examples, sizes of the original pooling kernel 810 and the sub-pooling kernels 811 to 813 and a size of the input feature map 820 are not limited to the non-limiting examples shown in the example of FIG. 8 and may vary and have other values.

The example processor 110 may include at least one arithmetic logic unit (ALU). As a non-limiting example in FIG. 8, the processor 110 includes ALU 110-1 and ALU 110-2, each of which performs an arithmetic operation related to the pooling operation. For convenience of description, two ALUs 110-1 and 110-2 are discussed in the example of FIG. 8, but ALUs in the processor 110 may be the same single ALU and/or the processor 110 may include three or more ALUs.

The processor 110 may receive a value of a current input pixel 825 included in a current window of the input feature map 820, according to a raster scan order for the input feature map 820. The processor 110 may update at least one partial pooling result stored in at least one memory cell in the share line buffer 125, where the partial pooling result is affected by the value of the current input pixel 825, in accordance with the value of the current input pixel 825. In such an example, the ALU 110-1 of the processor 110 may perform an arithmetic operation for updating the partial pooling result.

In such an example, the partial pooling result may be an intermediate value for obtaining an intermediate pooling result for all input pixels mapped to one sub-pooling kernel. For example, the sub-pooling kernel 811 may be mapped to 3 input pixels total in one window, and an intermediate pooling result for the 3 input pixels may be obtained only when all data of the mapped 3 input pixels have been received. However, because the input pixels of the input feature map 820 may be sequentially input to the processor 110 according to the raster scan order, it may be difficult to obtain the intermediate pooling result for the 3 input pixels at the same time.

Accordingly, in the case of a MaxPool approach, when a value of a first input pixel mapped to the sub-pooling kernel 811 is received, the processor 110 may store the value of the first input pixel as a maximum value in one memory cell of the share line buffer 125. When a value of a second input pixel is received, the processor 110 may compare the already stored maximum value, that is, the value of the first input pixel, to the value of the second input pixel and may update data of the memory cell to a maximum value from among these values, as necessary. In such an example, the data stored in the memory cell may correspond to the partial pooling result. Finally, when a value of a last third input pixel mapped to the sub-pooling kernel 811 is received, the processor 110 may compare the already stored maximum value, that is, the maximum value from among the value of the first input pixel and the value of the second input pixel, to the value of the third input pixel and finally updates the data of the memory cell to a maximum value from among all three of the input pixels. Because the sub-pooling kernel 811 may have the 1×3 size, the data of the memory cell finally updated by the value of the third input pixel may correspond to an intermediate pooling result corresponding to the sub-pooling kernel 811, in that each input pixel may have had an opportunity to affect the maximum pixel value.

Similarly, in the case of AvgPool, the processor 110 updates the partial pooling result by adding a received value of an input pixel and data already stored in the memory cell of the share line buffer 125.

In other words, when performing the pooling operation, the processor 110 may read pooling data from the share line buffer 125 of the memory 120, may update a partial pooling result already stored in the share line buffer 125 by using the ALU 110-1, and may write the partial pooling result to the share line buffer 125. By storing the accumulated partial pooling results, the information from the input pixels is able to be stored temporarily, thus avoiding the need for all pooling data to be available before the pooling process can begin.

The ALU 110-2 of the processor 110 may read intermediate pooling results for a current window from memory cells of the share line buffer 125 and may perform a post-processing according to a pre-set pooling type on the read intermediate pooling results to obtain a final pooling result corresponding to an input pixel value. In the example of FIG. 8, because the 3×3 original pooling kernel 810 may be decomposed into the three 1×3 sub-pooling kernels 811 to 813, the ALU 110-2 may read and post-process three intermediate pooling results retrieved from the share line buffer 125.

When the 3×3 original pooling kernel 810 is decomposed into the three 1×3 sub-pooling kernels 811 to 813 as in the example of FIG. 8, the share line buffer 125 may store pooling data in memory cells of 3 rows total. Alternatively put, the share line buffer 125 may store the intermediate pooling results obtained for the windows in the input feature map 820 in memory lines, shown as Row k*i, Row k*i+1, and Row k*i+2, of the number of rows corresponding to the height of the original pooling kernel 810, in a circular manner. In such an example, k refers to the height of the original pooling kernel 810, and according to the example of FIG. 8, k=3. However, FIG. 8 is a non-limiting example, and k may take on other values in other examples.

In particular, the intermediate pooling results corresponding to the same window in the input feature map 820 may be respectively stored in memory cells having memory addresses of the same column and different rows in the share line buffer 125. For example, when three intermediate pooling results respectively corresponding to the three sub-pooling kernels 811 to 813 are obtained for a window 821 of the input feature map 820, the three intermediate pooling results may be respectively stored in memory cells 1251, 1252, and 1253 of a first row and a first column, a second row and the first column, and a third row and the first column of the share line buffer 125, according to this approach.

When the stride is 1 and a window 822 to be pooled from the input feature map 820 has the same columns as the window 821 previously pooled, the window 821 and the window 822 may share input pixels of two rows. In other words, at least one of sub-pooling kernels regarding the current window 821 may be sharable as a sub-pooling kernel regarding at least one other window 822 in the input feature map 820. Accordingly, an intermediate pooling result obtained by a sharable sub-pooling kernel among the sub-pooling kernels mapped to the current window 821 may be shared with respect to the at least one other window 822.

When the intermediate pooling results for the window 821 are all stored in the memory cells 1251, 1252, and 1253, the ALU 110-2 of the processor 110 may post-process the intermediate pooling results stored in the memory cells 1251, 1252, and 1253 so as to output a final pooling result for the window 821. According to the raster scan order, at a time at which pooling is performed on the window 822 afterwards, data stored in the memory cell 1251 corresponding to the intermediate pooling result of the sub-pooling kernel 811 for the window 821 may no longer be used for the pooling operation. However, because the window 821 shares two rows with the window 822, the intermediate pooling results of the sub-pooling kernels 812 and 813 for the window 821 may be reused for the window 822. Accordingly, the intermediate pooling results stored in the memory cells 1252 and 1253 may not be deleted and may instead be reused to pool the window 822.

In other words, an intermediate pooling result stored in one memory cell of the share line buffer 125 may be deleted or over-written for an intermediate pooling result obtained by another sub-pooling kernel to be stored, when the intermediate pooling result stored in the one memory cell is no longer shared to obtain a final pooling result corresponding to another window. In this manner, the intermediate pooling results may be stored in the memory cells of the same column of the share line buffer 125, in a circular manner.

The examples described with reference to the example of FIG. 8 may be applied to a pooling operation based on an input feature map of another size, an original pooling kernel of another size, and a stride of another value, in the same manner, in various examples, and the particular details of the example of FIG. 8 are to be taken as non-limiting.

Figure 9:
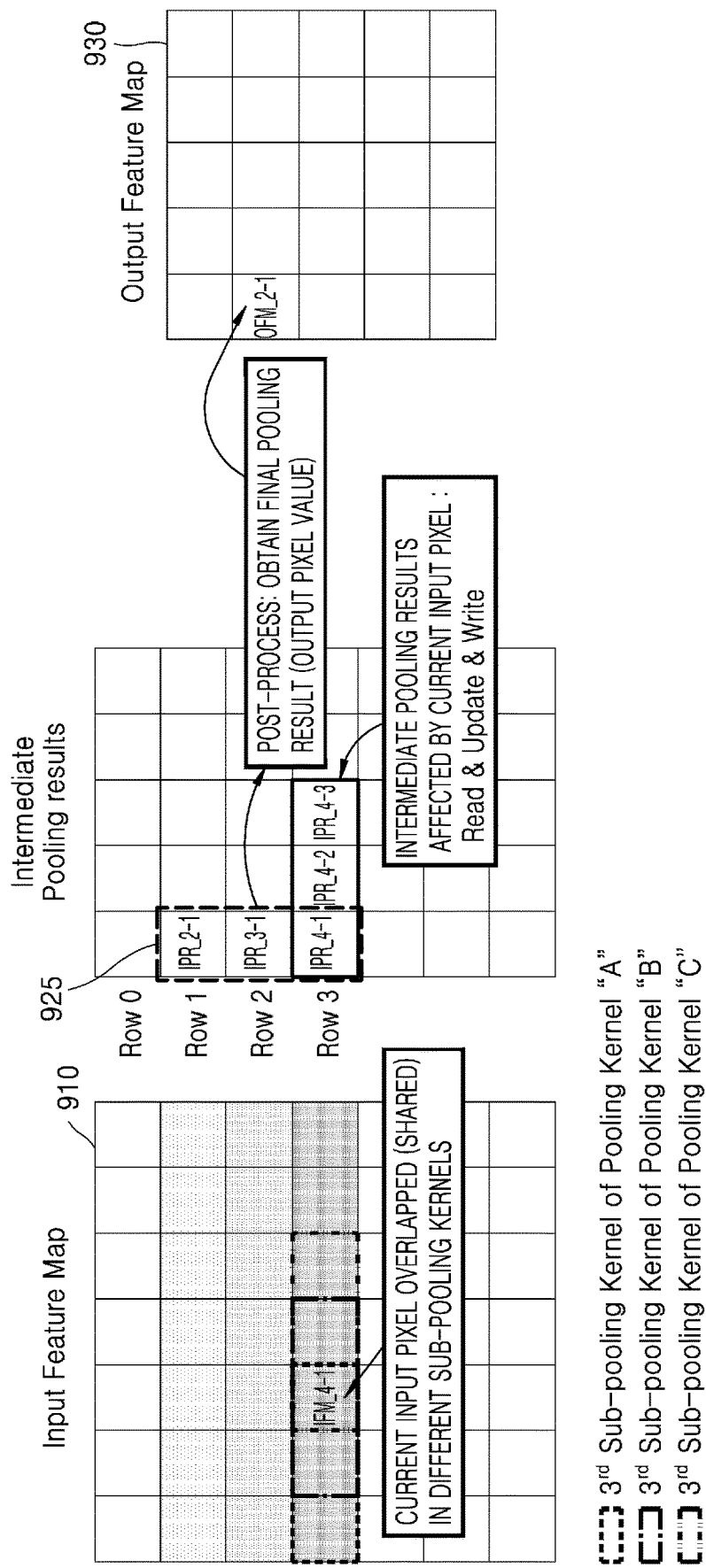
FIG. 9 is a diagram for describing processes of updating pooling data and generating an output feature map from the pooling data, according to an example.

FIG. 9 is a diagram for describing processes of updating pooling data and generating an output feature map 930 from the pooling data, according to an example.

Referring to the example of FIG. 9, an input pixel IFM_4-1 of an input feature map 910 may correspond to a current input pixel overlapped or shared in different sub-pooling kernels. In such an example, the different sub-pooling kernels may be indicated by dotted lines and broken lines as indicated in the example of FIG. 9. For example, the different sub-pooling kernels may correspond to a third sub-pooling kernel of a 3×3 original pooling kernel mapped to a window A, a third sub-pooling kernel of a 3×3 original pooling kernel mapped to a window B, and a third sub-pooling kernel of a 3×3 original pooling kernel mapped to a window C.

When the current input pixel is received, the processor 110 may update at least one partial pooling result affected by a value of the current input pixel. For example, when the input pixel IFM_4-1 is received according to a raster scan order, the processor 110 may update partial pooling results IPR_4-1, IPR_4-2, and IPR_4-3 based on the way in which they are affected by the input pixel IFM_4-1. When the updating of the partial pooling result IPR_4-1 is complete, the finally updated partial pooling result IPR_4-1 may correspond to an intermediate pooling result.

The processor 110 may obtain a final pooling result by performing a post-processing on intermediate pooling results 925, i.e., IPR_2-1, IPR_3-1, and IPR_4-1. The obtained final pooling result may correspond to an output pixel OFM_2-1 of the output feature map 930.

As such, when the processor 110 receives any one input pixel value, at least one partial pooling result stored in the share line buffer 125 and affected by the input pixel value may also be updated.

Generally, without the sub-pooling kernel approach discussed herein, when a value of any single input pixel is received, all pooling results for several windows including the input pixel may be repeatedly read/updated/written. For example, when a sufficiently large input feature map is pooled based on a 3×3 pooling kernel of a stride of 1, a processor and a share line buffer may read/update/write all pieces of pooling data corresponding to 9 pixel values of each of maximum 9 windows sharing the input pixel whenever the input pixel is received. Accordingly, a throughput of the processor and an access frequency between the processor and a memory, such as the share line buffer, is relatively high. However, when a pooling method according to the embodiments herein with sub-pooling approaches, e.g., employing 1D sub-pooling kernels decomposed from an original pooling kernel, less than all pieces of pooling data of the assigned kernel pieces of pooling data of the 1D sub-pooling kernels sharing an input pixel may be read/updated/written, which may therefore effectively reduce overhead of a processor and a memory, such as the shared line buffer.

Figure 10:
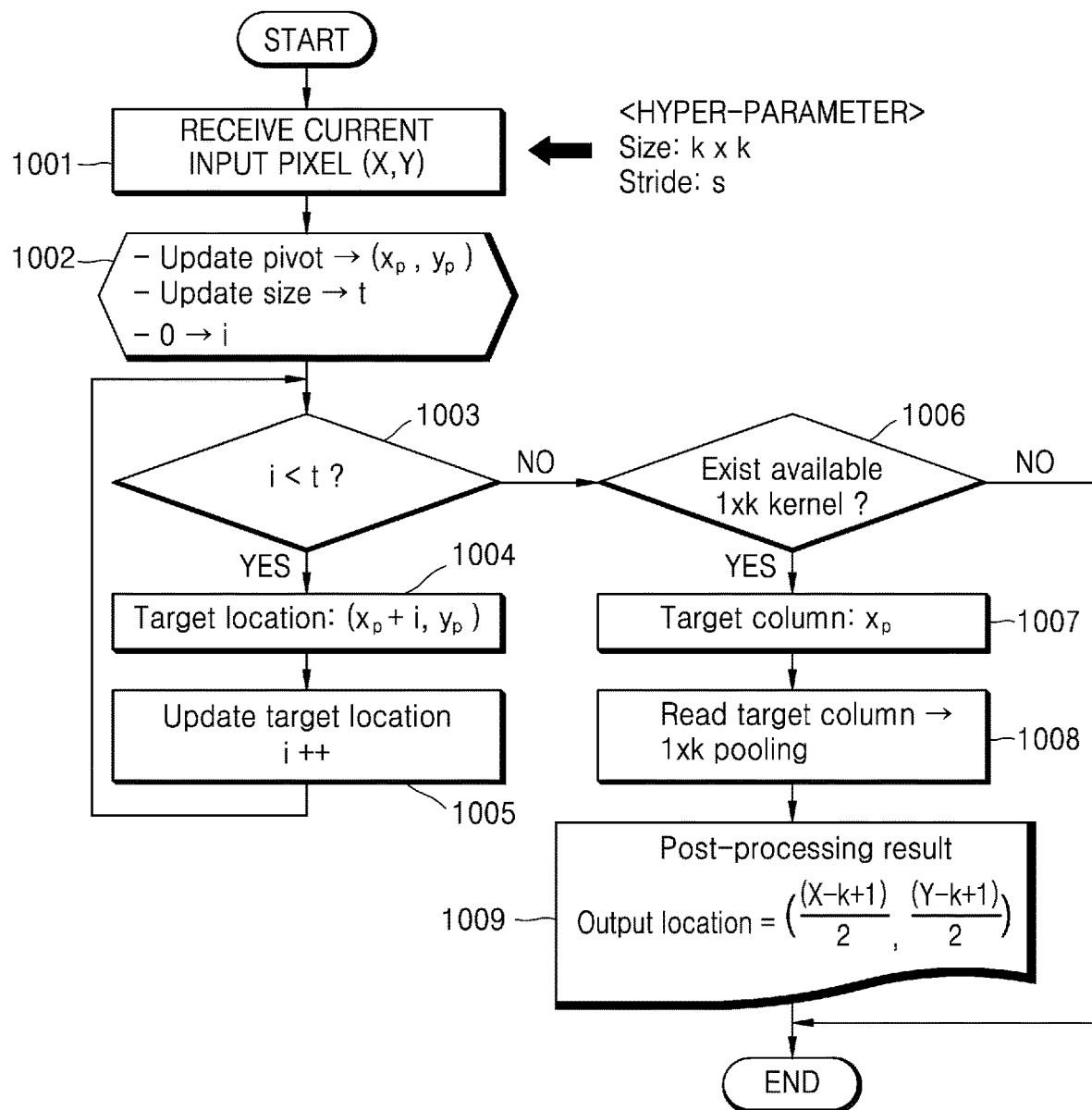
FIG. 10 is a flowchart for describing a pooling algorithm of a neural network, according to an example.

FIG. 10 is a flowchart of a neural network method, according to an example. Referring to the example of FIG. 10, the neural network method may be performed or implemented in a time-based series by the neural processing apparatus 100, such as in the example of FIG. 4. As a hyper-parameter of the pooling operation of the neural network method of the example of FIG. 10, a size of an original pooling kernel may be k×k and a stride may s, wherein k and s are natural numbers and s<k.

In addition, the pooling operations shown in the example of FIG. 10 may merely be an operation in which one input pixel of an input feature map is received. Accordingly, the neural network method of the example of FIG. 10 may be repeatedly performed on all pixels of the input feature map, and a current input pixel (X,Y) may be sequentially received according to a raster scan order of the input feature map in operation 1001 of the example of FIG. 10, such that all of the input pixels are processed.

In operation 1001, the processor 110 may receive the current input pixel (X,Y) in the input feature map, the input feature map having a width of W and a height of H. In such an example, $0 \leq X < W$ and $0 \leq Y < H$.

In operation 1002, the processor 110 may set a memory cell of an address $(x_p, y_p)$ among memory cells of the share line buffer 125 to correspond to an update pivot and may set an update size of the memory cell of the share line buffer 125 to correspond to t, wherein t is a natural number. Then, the processor 110 may initialize i to 0.

In such an example, in the update pivot $(x_p, y_p)$, $x_p = X \% k$ and $y_p = Y \% k$, and in the update size t, t is assigned the value of the update size.

In operation 1003, the processor 110 may determine whether a condition of i<t is satisfied. When the condition of i<t is satisfied, operation 1004 may be performed. However, when the condition of i<t is not satisfied, operation 1006 may be performed instead.

In operation 1004, the processor 110 may set a target address from among the memory cells of the share line buffer 125 to be $(x_p + i, y_p)$.

In operation 1005, the processor 110 may increase i by 1.

The processor 110 may perform operations 1003 to 1005 until the condition of i<t is no longer satisfied.

In operation 1006, in order to obtain a final pooling result, the processor 110 may determine whether intermediate pooling results capable of being post-processed, for example, a 1×k kernel such as the reference numeral 925 of the example of FIG. 9, may be present on the share line buffer 125. When there are no intermediate pooling results capable of being post-processed on the share line buffer 125, the neural network method regarding the current input pixel (X,Y) is ended and operation 1001 is initiated/restarted for a next input pixel.

In such an example, the processor 110 may determine whether an update is completed in the updated pivot regarding the current input pixel (X,Y) by using Equation 2 below as a conditional test and may determine whether the 1×k kernel capable of performing post-process is present by using Equation 3 below as a conditional test.

$$(X-k+1) \geq 0 \;\&\&\; (X-k+1)\% \, s = 0 \quad \text{Equation 2:}$$

$$(Y-k+1) \geq 0 \;\&\&\; (Y-k+1)\% \, s = 0 \quad \text{Equation 3:}$$

In operation 1007, the processor 110 may access an $x_p$ column on the share line buffer 125 as a target column.

In operation 1008, the processor 110 may read intermediate pooling results (1×k size) stored in the $x_p$ column on the share line buffer 125.

In operation 1009, the processor 110 may obtains the final pooling result by performing a post-processing on the read intermediate pooling results, according to a pre-set pooling type. The processor 110 determines that the obtained final pooling result corresponds to a value of an output pixel at a location $((X-k+1)/2, (Y-k+1)/2)$ of an output feature map.

The processor 110 may repeatedly perform the neural network method described in further detail, above, until the output feature map is completed as final pooling results are obtained for all intermediate pooling results obtained from the input feature map.

Figure 11:
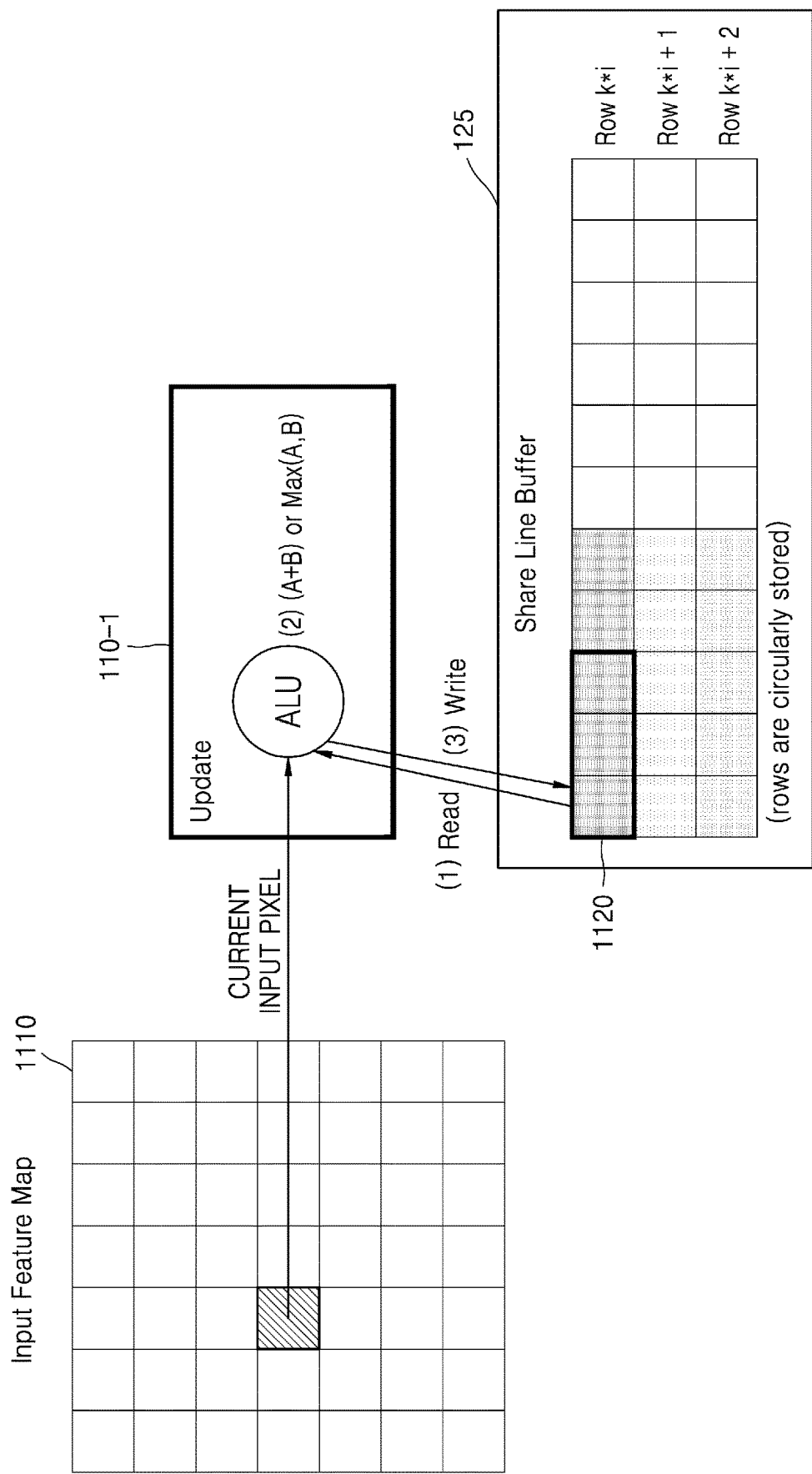
FIG. 11 is a diagram for describing a process of updating pooling data on a share line buffer by receiving a current input pixel, according to an example.

FIG. 11 is a diagram for describing a process of a processor of updating pooling data 1120 on a share line buffer by receiving a current input pixel, according to an example. For convenience of explanation, the operations of FIG. 11 will be descried with reference to the processor 110 and share line buffer of 125 of FIG. 4, noting that examples are not limited thereto.

Referring to the example of FIG. 11, when the ALU 110-1 of the processor 110 receives a current input pixel in an input feature map 1110, the ALU 110-1 reads the pooling data 1120 that is, a partial pooling result, stored in the share line buffer 125 affected by the current input pixel. As described in further detail above, the read pooling data 1120 may be data stored in memory cells of the same row, but different columns.

The ALU 110-1 may update the pooling data 1120 based on the pooling data 1120 and a value of the current input pixel. For example, the ALU 110-1 may determine a maximum value according to a MaxPool technique as described in further detail, above, or perform an adding operation according to AvgPool as described in further detail, above.

In other words, according to the examples employing the 1D sub-pooling kernel, as described in further detail, above, only the pooling data 1120 of 1D sub-pooling kernels sharing the current input pixel is read/updated/written at a given time, and thus, overheads of the processor 110 and the share line buffer 125 may be effectively reduced by managing data in this manner, compared to a general process without sub-pooling.

Figure 12:
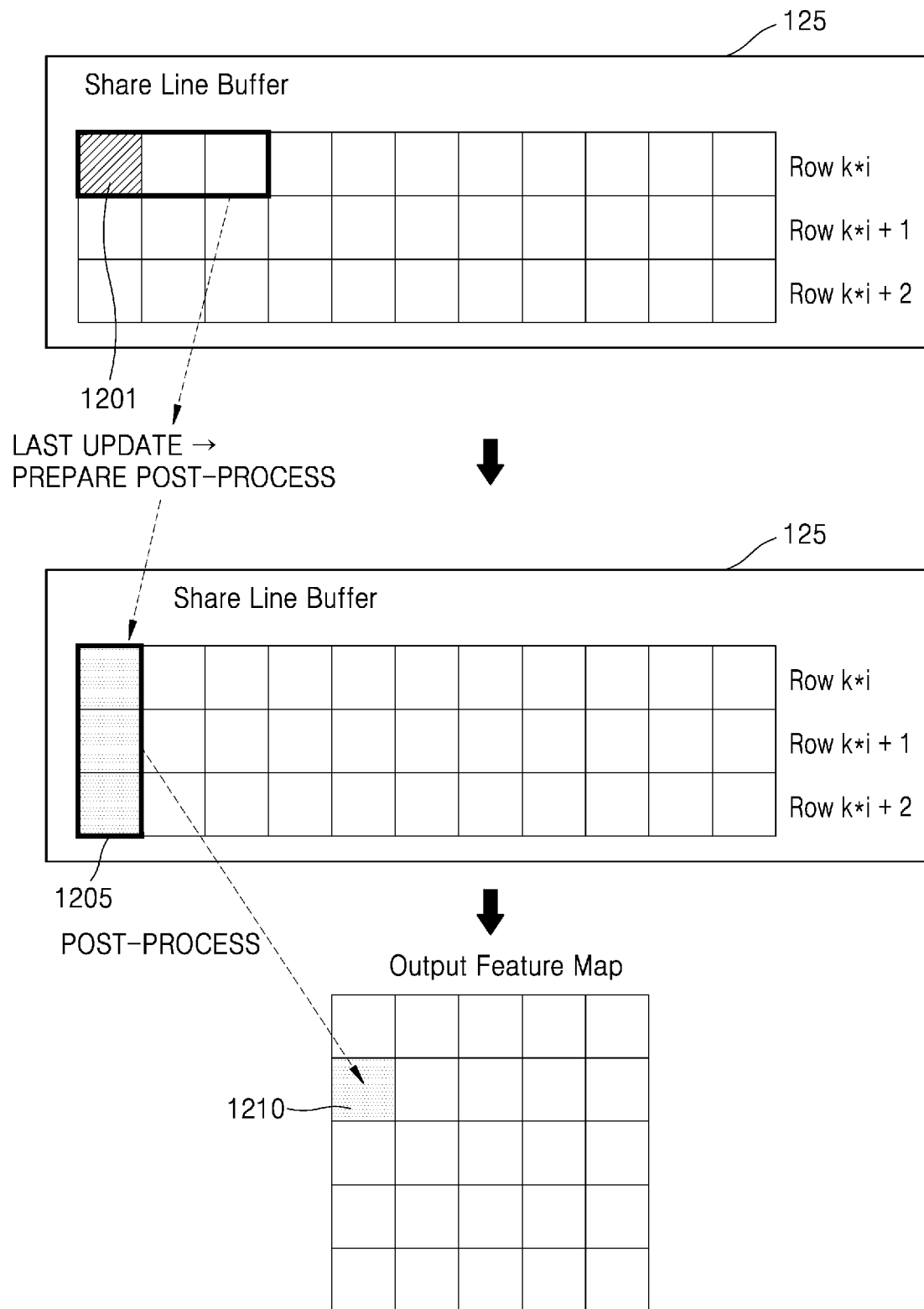
FIG. 12 is a diagram for describing a process of obtaining a final pooling result by post-processing intermediate pooling results stored in a share line buffer, according to an example.

FIG. 12 is a diagram for describing a process of a processor of obtaining a final pooling result by post-processing intermediate pooling results 1205 stored in a share line buffer, according to an example. For convenience of explanation, the operations of FIG. 12 will be descried with reference to the processor 110 and share line buffer of 125 of FIG. 4, noting that examples are not limited thereto.

Referring to the example of FIG. 12, when a partial pooling result stored in a memory cell 1201 of the share line buffer 125 is finally updated, the finally updated partial pooling result corresponds to an intermediate pooling result.

The processor 110 may read intermediate pooling results 1205 stored in all memory cells of the same column as the memory cell 1201 in which the intermediate pooling result is stored. In such an example, it is assumed that the intermediate pooling results 1205 are all finally updated results, as discussed in further detail, previously.

The processor 110 may obtain a final pooling result corresponding to the intermediate pooling results 1205 by performing a post-processing on the intermediate pooling results 1205, according to a pre-set pooling type. Various non-limiting examples of pooling have been discussed in greater detail, above. As a result, the processor 110 may generate an output feature map based on a value of an output pixel 1210 corresponding to the final pooling result.

Intermediate pooling results stored in the same column of the share line buffer 125 may be, as described above, pre-processed results of a pooling operation performed by each of sub-pooling kernels mapped to a window. Accordingly, the processor 110 may complete pooling on the corresponding window by performing a post-processing of a pooling operation of merging the intermediate pooling results stored in the same column.

Figure 13:
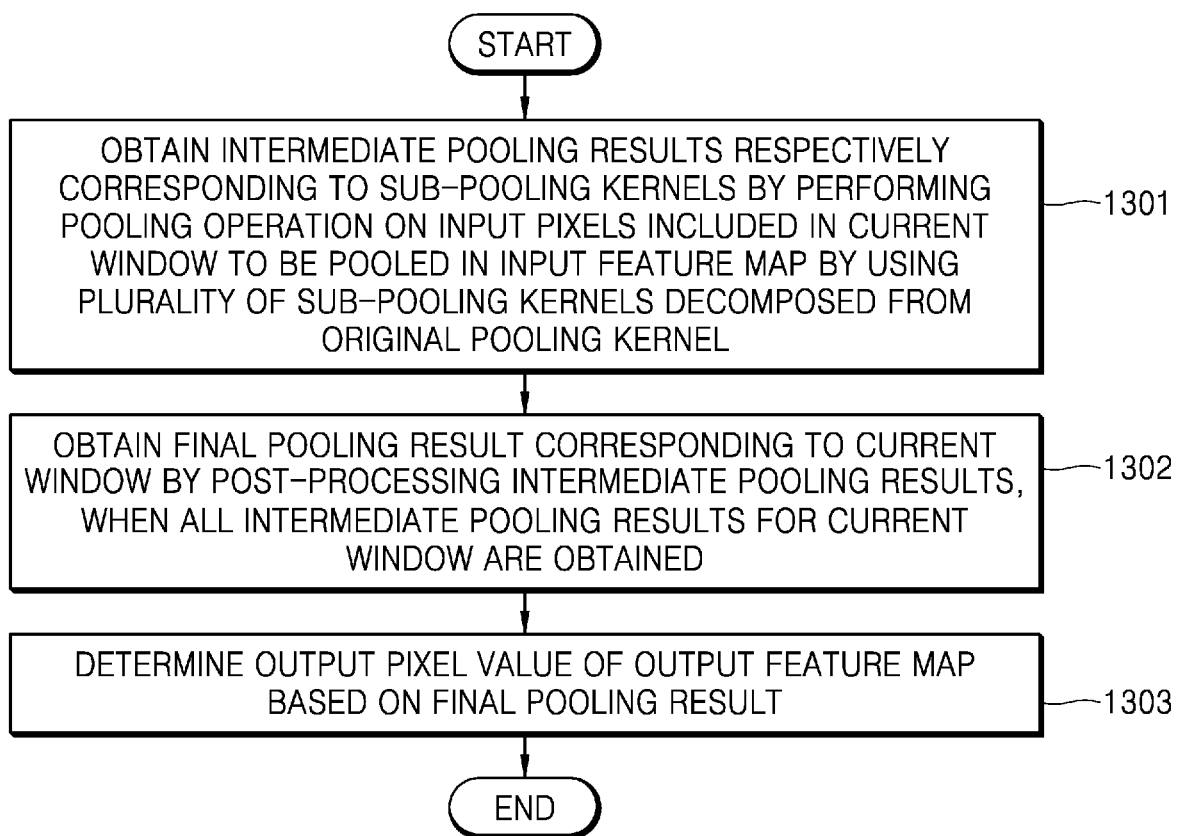
FIG. 13 is a flowchart of a method, performed by a neural processing apparatus, of processing pooling of a neural network, according to an example.

FIG. 13 is a flowchart of a neural network method, performed by an apparatus, including processing pooling of a neural network, according to an example. Referring to the example of FIG. 13, because the neural network method of FIG. 13 is related to the examples described above with reference to the drawings, the descriptions above are also applicable to the operations of FIG. 13.

In operation 1301, the processor 110 may obtain intermediate pooling results respectively corresponding to sub-pooling kernels by performing a pooling operation on input pixels included in a current window to be pooled in an input feature map by using a plurality of sub-pooling kernels decomposed from an original pooling kernel. In such an example, the current window may be determined as the original pooling kernel is slid according to a raster scan order in the input feature map.

In operation 1302, when all of the intermediate pooling results are obtained for the current window, the processor 110 may obtain a final pooling result corresponding to the current window by post-processing the intermediate pooling results.

In operation 1303, the processor 110 may determine an output pixel value of an output feature map based on the final pooling result.

The pooling of the neural network according to the examples is processed based on a hyper-parameter including information about a size of the original pooling kernel, a stride size, and a pooling type. Alternatively put, the number of sub-pooling kernels to be decomposed, the minimum required number of memory lines of the share line buffer 125, and an update pivot and update size of the share line buffer 125 described with reference to the example of FIG. 10 may all be set based on the hyper-parameter. In addition, the share line buffer 125 storing the obtained intermediate pooling results may be addressed based on the hyper-parameter.

The neural processing apparatuses, neural processing apparatus 100, processors, processor 110, ALUS, ALUs 110-1, 110-2, memories, memory 120, share line buffers, and share line buffer 125, in FIGS. 1-13 that perform the operations described in this application are implemented by hardware components configured to perform the operations described in this application that are performed by the hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-13 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions in the specification, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A processor-implemented method of a neural network, the method comprising:
   obtaining intermediate pooling results, respectively corresponding to sub-pooling kernels obtained by decomposing an original pooling kernel, by performing a pooling operation on input pixels included in a current window in an input feature map using the sub-pooling kernels;
   obtaining a final pooling result corresponding to the current window by post-processing the intermediate pooling results; and
   determining an output pixel value of an output feature map, based on the final pooling result,
   wherein the current window is determined according to the original pooling kernel having been slid, according to a raster scan order, in the input feature map, and
   wherein the sub-pooling kernels are 1-dimensional (1D) kernels, respectively comprising row elements of the original pooling kernel, and a total number of sub-pooling kernels obtained by decomposing from the original pooling kernel corresponds to a height of the original pooling kernel.

2. The method of claim 1, wherein an intermediate pooling result obtained by a sub-pooling kernel from among the sub-pooling kernels with respect to the current window is shared with at least one other window in the input feature map.

3. The method of claim 1, wherein the final pooling result is obtained in response to all of the intermediate pooling results being obtained for the current window.

4. The method of claim 1, wherein intermediate pooling results corresponding to a same window are respectively stored in memory cells comprising memory addresses of a same column and different rows in a share line buffer.

5. The method of claim 4, further comprising:
   receiving a value of a current input pixel included in the current window according to the raster scan order for the input feature map, wherein the obtaining of the intermediate pooling results comprises
  updating at least one partial pooling result stored in at least one memory cell affected by the received value of the current input pixel, based on the received value of the current input pixel.

6. The method of claim 4, wherein the obtaining of the final pooling result corresponding to the current window comprises:
  reading the intermediate pooling results for the current window from the memory cells of the share line buffer; and
  obtaining the final pooling result corresponding to the output pixel value by performing, on the read intermediate pooling results, a post-processing operation according to a pre-set pooling type.

7. The method of claim 4, wherein the share line buffer stores, in memory lines of a total number of rows corresponding to a height of the original pooling kernel, intermediate pooling results obtained for other windows in the input feature map, in a circular manner.

8. The method of claim 7, wherein an intermediate pooling result stored in one memory cell of the share line buffer is re-used for a subsequent intermediate pooling result obtained by another sub-pooling kernel to be stored, in response to the intermediate pooling result stored in the one memory cell no longer being shared, to obtain a final pooling result corresponding to another window.

9. The method of claim 1, further comprising:
  obtaining a hyper-parameter, of the neural network, comprising information about any one or any combination of any two or more of a size of the original pooling kernel, a stride size, and a pooling type, wherein
  a share line buffer storing the obtained intermediate pooling results is addressed based on the obtained hyper-parameter.

10. The method of claim 1, wherein
  the pooling operation is an operation based on a pooling type of max pooling, wherein each of the intermediate pooling results is a maximum value from among values of input pixels mapped to a corresponding sub-pooling kernel and the final pooling result is a maximum value among the intermediate pooling results, or
  the pooling operation is an operation based on a pooling type of average pooling, wherein each of the intermediate pooling results is a sum of the values of input pixels mapped to the corresponding sub-pooling kernel and the final pooling result is a value obtained by dividing a sum of the intermediate pooling results by a size of the original pooling kernel.

11. A non-transitory computer-readable storage medium storing instructions that, when executed by one or more processors, cause the one or more processors to perform the method of claim 1.

12. A neural processing apparatus, comprising:
  one or more processors configured to:
    obtain intermediate pooling results respectively corresponding to sub-pooling kernels obtained by decomposing an original pooling kernel, by performing a pooling operation on input pixels included in a current window in an input feature map with the sub-pooling kernels,
    obtain a final pooling result corresponding to the current window by post-processing the intermediate pooling results, and
    determine an output pixel value of an output feature map, based on the final pooling result,
  wherein the current window is determined according to the original pooling kernel having been slid, according to a raster scan order, in the input feature map,
  wherein the sub-pooling kernels are 1-dimensional (1D) kernels respectively comprising row elements of the original pooling kernel, and wherein total number of sub-pooling kernels obtained by decomposing from the original pooling kernel corresponds to a height of the original pooling kernel.

13. The neural processing apparatus of claim 12, further comprising a memory configured to store instructions, that when executed by the one or more processors configure the one or more processors to perform the obtaining of the intermediate pooling results, the obtaining of the final pooling result, and the determining of the output pixel value.

14. The neural processing apparatus of claim 12, wherein an intermediate pooling result obtained by a sub-pooling kernel from among the sub-pooling kernels with respect to the current window is shared with at least one other window in the input feature map.

15. The neural processing apparatus of claim 12, wherein the final pooling result is obtained in response to all of the intermediate pooling results being obtained for the current window.

16. The neural processing apparatus of claim 12, wherein intermediate pooling results corresponding to a same window are respectively stored in memory cells comprising memory addresses of a same column and different rows in a share line buffer included in the memory.

17. The neural processing apparatus of claim 16, wherein the one or more processors are further configured to:
  receive a value of a current input pixel included in the current window according to the raster scan order for the input feature map; and
  update at least one partial pooling result stored in at least one memory cell affected by the received value of the current input pixel, based on the received value of the current input pixel.

18. The neural processing apparatus of claim 16, wherein the one or more processors are further configured to:
  read the intermediate pooling results for the current window from the memory cells of the share line buffer to obtain the final pooling result corresponding to the current window and obtain the final pooling result corresponding to the output pixel value by performing, on the read intermediate pooling results, a post-processing operation according to a pre-set pooling type.

19. The neural processing apparatus of claim 16, wherein the share line buffer stores, in memory lines of a total number of rows corresponding to a height of the original pooling kernel, intermediate pooling results obtained for other windows in the input feature map, in a circular manner.

20. The neural processing apparatus of claim 19, wherein an intermediate pooling result stored in one memory cell of the share line buffer is re-used for a subsequent intermediate pooling result obtained by another sub-pooling kernel to be stored, in response to the intermediate pooling result stored in the one memory cell no longer being shared, to obtain a final pooling result corresponding to another window.

21. The neural processing apparatus of claim 12, wherein the one or more processors are further configured to:
  obtain a hyper-parameter of the neural network, comprising information about any one or any combination of any two or more of a size of the original pooling kernel, a stride size, and a pooling type, wherein a share line buffer included in the memory to store the obtained intermediate pooling results is addressed based on the hyper-parameter.

22. The neural processing apparatus of claim 12, wherein the pooling operation is an operation based on a pooling type of max pooling, wherein each of the intermediate pooling results is a maximum value from among values of input pixels mapped to a corresponding sub-pooling kernel and the final pooling result is a maximum value among the intermediate pooling results, or the pooling operation is an operation based on a pooling type of average pooling, wherein each of the intermediate pooling results is a sum of the values of input pixels mapped to the corresponding sub-pooling kernel and the final pooling result is a value obtained by dividing a sum of the intermediate pooling results by a size of the original pooling kernel.

23. A processor-implemented method of a neural network, the method comprising:
    obtaining intermediate pooling results, respectively corresponding to sub-pooling kernels obtained by decomposing an original pooling kernel, from input pixels included in a current window to be pooled in an input feature map with sub-pooling kernels;
    obtaining a final pooling result corresponding to the current window from the intermediate pooling results, in response to the intermediate pooling being complete for the current window, the current window being determined as the original pooling kernel is slid in the input feature map; and
    determining an output pixel value of an output feature map, based on the final pooling result, wherein
    the sub-pooling kernels are 1-dimensional (1D) kernels, respectively comprising row elements of the original pooling kernel, and a total number of sub-pooling kernels obtained by decomposing from the original pooling kernel corresponds to a height of the original pooling kernel.

24. The method of claim 23, wherein the original pooling kernel is slid according to a raster scan order.

25. The method of claim 23, wherein at least one of the sub-pooling kernels with respect to the current window is shared as a sub-pooling kernel with respect to at least one other window in the input feature map.

\* \* \* \* \*